(12) United States Patent
Purkait et al.

(10) Patent No.: US 12,502,465 B2
(45) Date of Patent: Dec. 23, 2025

(54) DIALYSIS TREATMENT FILE SIMULATION AND VERIFICATION SYSTEM

(71) Applicant: Fresenius Medical Care Holdings, Inc., Waltham, MA (US)

(72) Inventors: Heena Purkait, Stoneham, MA (US); Vikrant Dhavale, Waltham, MA (US); Hussein Saliany, Nashua, NH (US); Ameer Sulaiman, Attleboro, MA (US)

(73) Assignee: FRESENIUS MEDICAL CARE HOLDINGS, INC., Waltham, MA (US)

( * ) Notice: Subject to any disclaimer, the term of this patent is extended or adjusted under 35 U.S.C. 154(b) by 380 days.

(21) Appl. No.: 17/708,914

(22) Filed: Mar. 30, 2022

(65) Prior Publication Data

US 2023/0310724 A1    Oct. 5, 2023

(51) Int. Cl.
| | |
|---|---|
| *A61M 1/16* | (2006.01) |
| *A61M 1/14* | (2006.01) |
| *A61M 1/28* | (2006.01) |
| *G16H 10/60* | (2018.01) |
| *G16H 20/40* | (2018.01) |

(Continued)

(52) U.S. Cl.
CPC .......... *A61M 1/1613* (2014.02); *A61M 1/153* (2022.05); *A61M 1/282* (2014.02); *G16H 10/60* (2018.01); *G16H 20/40* (2018.01); *G16H 40/67* (2018.01); *G16H 50/50* (2018.01); *A61M 2205/18* (2013.01); *A61M 2205/502* (2013.01); *A61M 2205/52* (2013.01)

(58) Field of Classification Search
CPC .... A61M 1/1613; A61M 1/153; A61M 1/282; A61M 2205/18; A61M 2205/502; A61M 2205/52; G16H 10/60; G16H 20/40; G16H 40/67; G16H 50/50
See application file for complete search history.

(56) References Cited

U.S. PATENT DOCUMENTS

| | | |
|---|---|---|
| 5,853,292 A | 12/1998 | Eggert et al. |
| 6,193,519 B1 | 2/2001 | Eggert et al. |

(Continued)

FOREIGN PATENT DOCUMENTS

| | | |
|---|---|---|
| CN | 204650870 U | 9/2015 |
| CN | 105784406 A | 7/2016 |

(Continued)

OTHER PUBLICATIONS

International Patent Application No. PCT/US2023/013776, Search Report (Jun. 1, 2023).

*Primary Examiner* — Mamon Obeid
*Assistant Examiner* — Malak M Nasser
(74) *Attorney, Agent, or Firm* — Leydig, Voit & Mayer, Ltd.

(57) ABSTRACT

A system and method is provided for generating simulated dialysis treatment files. For instance, a computing device may obtain information such as general patient information, dialysis prescription information, and dialysis treatment information. The computing device may generate a dialysis treatment file based on the obtained information, and use the dialysis treatment file to verify and test an enterprise system. For instance, the generated dialysis treatment file may be used to ensure the enterprise system is functioning properly.

20 Claims, 19 Drawing Sheets

(51) Int. Cl.
*G16H 40/67* (2018.01)
*G16H 50/50* (2018.01)

(56) References Cited

U.S. PATENT DOCUMENTS

| | | |
|---|---|---|
| 6,386,882 B1 | 5/2002 | Linberg |
| 6,443,735 B1 | 9/2002 | Eggert et al. |
| 6,503,087 B1 | 1/2003 | Eggert et al. |
| 6,527,558 B1 | 3/2003 | Eggert et al. |
| 6,535,714 B2 | 3/2003 | Melker et al. |
| 6,758,676 B2 | 7/2004 | Eggert et al. |
| 7,114,954 B2 | 10/2006 | Eggert et al. |
| 7,192,284 B2 | 3/2007 | Eggert et al. |
| 7,464,040 B2 | 12/2008 | Joao |
| 7,490,048 B2 | 2/2009 | Joao |
| 7,811,090 B2 | 10/2010 | Eggert et al. |
| 7,976,312 B2 | 7/2011 | Eggert et al. |
| 7,976,313 B2 | 7/2011 | Eggert et al. |
| 8,016,598 B2 | 9/2011 | Eggert et al. |
| 8,152,532 B2 | 4/2012 | Eggert et al. |
| 8,346,482 B2 | 1/2013 | Fernandez |
| 8,364,411 B2 | 1/2013 | Fernandez |
| 8,364,413 B2 | 1/2013 | Fernandez |
| 8,370,068 B1 | 2/2013 | Fernandez |
| 8,370,070 B2 | 2/2013 | Fernandez |
| 8,370,071 B2 | 2/2013 | Fernandez |
| 8,370,072 B2 | 2/2013 | Fernandez |
| 8,370,073 B2 | 2/2013 | Fernandez |
| 8,370,078 B2 | 2/2013 | Fernandez |
| 8,374,796 B2 | 2/2013 | Fernandez |
| 8,419,438 B2 | 4/2013 | Eggert et al. |
| 8,423,298 B2 | 4/2013 | Fernandez |
| 8,678,832 B2 | 3/2014 | Eggert et al. |
| 8,696,362 B2 | 4/2014 | Eggert et al. |
| 8,827,708 B2 | 9/2014 | Christensen et al. |
| 8,951,047 B2 | 2/2015 | Egger et al. |
| 9,004,922 B2 | 4/2015 | Eggert et al. |
| 9,047,787 B2 | 6/2015 | Pybus et al. |
| 9,110,836 B1 | 8/2015 | Fernandez |
| 9,111,026 B1 | 8/2015 | Fernandez |
| 9,147,041 B2 | 9/2015 | Amarasingham et al. |
| 9,230,221 B2 | 1/2016 | Gobert et al. |
| 9,317,115 B2 | 4/2016 | Gobert et al. |
| 9,324,247 B2 | 4/2016 | Eggert et al. |
| 9,336,354 B1 | 5/2016 | Sankara et al. |
| 9,378,659 B2 | 6/2016 | Eggert et al. |
| 9,406,244 B2 | 8/2016 | Eggert et al. |
| 9,536,052 B2 | 1/2017 | Amarasingham et al. |
| 9,715,839 B2 | 7/2017 | Pybus et al. |
| 9,719,147 B1 | 8/2017 | Fernandez |
| 9,801,993 B2 | 10/2017 | Barrett et al. |
| 9,839,483 B2 | 12/2017 | Sankaran et al. |
| 9,870,720 B2 | 1/2018 | Eggert et al. |
| 9,993,303 B2 | 6/2018 | Sankaran et al. |
| 10,061,899 B2 | 8/2018 | Miller et al. |
| 10,068,061 B2 | 9/2018 | Miller et al. |
| 10,089,443 B2 | 10/2018 | Miller et al. |
| 10,095,840 B2 | 10/2018 | Miller et al. |
| 10,224,117 B2 | 3/2019 | Miller et al. |
| 10,285,762 B2 | 5/2019 | Sankaran et al. |
| 10,311,970 B2 | 6/2019 | Tiwari et al. |
| 10,314,654 B2 | 6/2019 | Sankaran et al. |
| 10,496,788 B2 | 12/2019 | Amarasingham et al. |
| 10,593,426 B2 | 3/2020 | Amarasingham et al. |
| 10,726,744 B2 | 7/2020 | Benson et al. |
| 10,755,369 B2 | 8/2020 | Amarasingham et al. |
| 10,758,660 B2 | 9/2020 | Leinfellner et al. |
| 10,786,308 B2 | 9/2020 | Sankaran et al. |
| 10,867,708 B2 | 12/2020 | Cocks et al. |
| 10,878,936 B2 | 12/2020 | Fernandez |
| 11,031,128 B2 | 6/2021 | Plahey et al. |
| 2001/0032099 A1 | 10/2001 | Joao |
| 2002/0001794 A1 | 1/2002 | Melker et al. |
| 2002/0032583 A1 | 3/2002 | Joao |
| 2002/0132214 A1 | 9/2002 | Mattson et al. |
| 2003/0011646 A1 | 1/2003 | Levine et al. |
| 2003/0073060 A1 | 4/2003 | Eggert et al. |
| 2003/0091968 A1 | 5/2003 | Eggert et al. |
| 2004/0157199 A1 | 8/2004 | Eggert et al. |
| 2004/0214150 A1 | 10/2004 | Eggert et al. |
| 2005/0043894 A1 | 2/2005 | Fernandez |
| 2006/0040245 A1 | 2/2006 | Airola et al. |
| 2006/0178841 A1 | 8/2006 | Fernandez |
| 2006/0253259 A1 | 11/2006 | Fernandez |
| 2007/0106333 A1 | 5/2007 | Fernandez |
| 2007/0122785 A1 | 5/2007 | Eggert et al. |
| 2008/0059249 A1 | 3/2008 | Joao |
| 2008/0059250 A1 | 3/2008 | Joao |
| 2008/0077375 A1 | 3/2008 | Fernandez |
| 2008/0131855 A1 | 6/2008 | Eggert et al. |
| 2008/0138778 A1 | 6/2008 | Eggert et al. |
| 2008/0138779 A1 | 6/2008 | Eggert et al. |
| 2008/0138780 A1 | 6/2008 | Eggert et al. |
| 2008/0176210 A1 | 7/2008 | Moll et al. |
| 2009/0148822 A1 | 6/2009 | Eggert et al. |
| 2009/0198450 A1 | 8/2009 | Fernandez |
| 2009/0198451 A1 | 8/2009 | Fernandez |
| 2009/0204379 A1 | 8/2009 | Fernandez |
| 2009/0215011 A1 | 8/2009 | Christensen et al. |
| 2009/0222215 A1 | 9/2009 | Fernandez |
| 2009/0248450 A1 | 10/2009 | Fernandez |
| 2009/0253587 A1 | 10/2009 | Fernandez |
| 2009/0305214 A1 | 12/2009 | Pybus et al. |
| 2009/0313049 A1 | 12/2009 | Joao et al. |
| 2010/0010423 A1 | 1/2010 | Yu et al. |
| 2010/0010425 A1 | 1/2010 | Yu et al. |
| 2010/0042440 A1 | 2/2010 | Joao |
| 2010/0049546 A1 | 2/2010 | Neville |
| 2010/0114602 A1 | 5/2010 | Joao et al. |
| 2010/0217178 A1 | 8/2010 | Lo et al. |
| 2010/0217180 A1 | 8/2010 | Akonur et al. |
| 2010/0285082 A1 | 11/2010 | Fernandez |
| 2010/0304347 A1 | 12/2010 | Eggert et al. |
| 2011/0087499 A1* | 4/2011 | Menon ............... G06Q 10/10 705/2 |
| 2011/0107253 A1 | 5/2011 | Levine et al. |
| 2011/0118573 A1* | 5/2011 | McKenna ............. A61B 5/746 600/323 |
| 2011/0213625 A1 | 9/2011 | Joao |
| 2011/0257891 A1 | 10/2011 | Akonur et al. |
| 2011/0265008 A1 | 10/2011 | Levine et al. |
| 2011/0311956 A1 | 12/2011 | Eggert et al. |
| 2012/0029324 A1 | 2/2012 | Akonur et al. |
| 2012/0197183 A1 | 8/2012 | Yu et al. |
| 2012/0214145 A1 | 8/2012 | Eggert et al. |
| 2012/0218111 A1* | 8/2012 | Batchelder ............ A61B 5/743 340/573.1 |
| 2013/0054264 A1 | 2/2013 | Baronov et al. |
| 2013/0085775 A1 | 4/2013 | Baronov et al. |
| 2013/0191097 A1 | 7/2013 | Hocum et al. |
| 2013/0226845 A1 | 8/2013 | Gobert et al. |
| 2013/0231949 A1 | 9/2013 | Baronov et al. |
| 2013/0262357 A1 | 10/2013 | Amarasingham et al. |
| 2013/0274644 A1* | 10/2013 | Hertz ................... G16H 20/40 604/4.01 |
| 2013/0275050 A1 | 10/2013 | Neville |
| 2013/0310726 A1 | 11/2013 | Miller et al. |
| 2013/0317753 A1 | 11/2013 | Kamen et al. |
| 2013/0317795 A1 | 11/2013 | Akonur et al. |
| 2013/0330699 A1 | 12/2013 | Eggert et al. |
| 2014/0042092 A1 | 2/2014 | Akonur et al. |
| 2014/0074509 A1 | 3/2014 | Amarasingham et al. |
| 2014/0099617 A1* | 4/2014 | Tallman, Jr. ......... G09B 23/303 434/262 |
| 2014/0127663 A1 | 5/2014 | Eggert et al. |
| 2014/0180711 A1 | 6/2014 | Kamen et al. |
| 2014/0188516 A1 | 7/2014 | Kamen et al. |
| 2014/0205981 A1* | 7/2014 | Ryder .................. G09B 7/06 434/262 |
| 2014/0205983 A1 | 7/2014 | Eggert et al. |
| 2014/0220529 A1 | 8/2014 | Eggert et al. |
| 2014/0230071 A1* | 8/2014 | Adam ................... G16H 20/40 726/26 |
| 2014/0266983 A1 | 9/2014 | Christensen |

(56) References Cited

U.S. PATENT DOCUMENTS

| | | |
|---|---|---|
| 2015/0154888 A1 | 6/2015 | Eggert et al. |
| 2015/0194066 A1 | 7/2015 | Samosky et al. |
| 2015/0213202 A1 | 7/2015 | Amarasingham et al. |
| 2015/0213206 A1 | 7/2015 | Amarasingham et al. |
| 2015/0213207 A1 | 7/2015 | Amarasingham et al. |
| 2015/0213217 A1 | 7/2015 | Amarasingham et al. |
| 2015/0213222 A1 | 7/2015 | Amarasingham et al. |
| 2015/0213223 A1 | 7/2015 | Amarasingham et al. |
| 2015/0213224 A1 | 7/2015 | Amarasingham et al. |
| 2015/0213225 A1 | 7/2015 | Amarasingham et al. |
| 2015/0221237 A1 | 8/2015 | Eggert et al. |
| 2016/0019666 A1 | 1/2016 | Amarasingham et al. |
| 2016/0026247 A1 | 1/2016 | Gobert et al. |
| 2016/0111023 A1 | 4/2016 | Pybus et al. |
| 2016/0125161 A1 | 5/2016 | Sankaran et al. |
| 2016/0125549 A1 | 5/2016 | Joao et al. |
| 2016/0125550 A1 | 5/2016 | Joao et al. |
| 2016/0125765 A1 | 5/2016 | Meretei et al. |
| 2016/0133158 A1 | 5/2016 | Sui et al. |
| 2016/0175053 A1 | 6/2016 | Sankaran et al. |
| 2016/0217265 A1 | 7/2016 | Miller et al. |
| 2016/0220123 A1 | 8/2016 | Grady et al. |
| 2016/0220124 A1 | 8/2016 | Grady et al. |
| 2016/0235901 A1 | 8/2016 | Miller et al. |
| 2016/0239637 A1 | 8/2016 | Miller et al. |
| 2016/0314601 A1 | 10/2016 | Sankaran et al. |
| 2016/0372009 A1 | 12/2016 | Eggert et al. |
| 2017/0011175 A1 | 1/2017 | Cocks et al. |
| 2017/0011190 A1 | 1/2017 | Joao |
| 2017/0039423 A1 | 2/2017 | Cork et al. |
| 2017/0178541 A9 | 6/2017 | Pybus et al. |
| 2017/0193160 A1 | 7/2017 | Long et al. |
| 2017/0220769 A1 | 8/2017 | Miller et al. |
| 2017/0229044 A1 | 8/2017 | Benson et al. |
| 2017/0262610 A1 | 9/2017 | Azevedo |
| 2017/0361009 A1 | 12/2017 | Neftel |
| 2018/0068465 A1 | 3/2018 | Sankaran et al. |
| 2018/0075217 A1 | 3/2018 | Tiwari et al. |
| 2018/0137783 A1 | 5/2018 | Eggert et al. |
| 2018/0218110 A1 | 8/2018 | Hocum et al. |
| 2018/0256260 A1 | 9/2018 | Sankaran et al. |
| 2018/0344919 A1 | 12/2018 | Jones et al. |
| 2019/0018931 A1 | 1/2019 | Chamney et al. |
| 2019/0019570 A1 | 1/2019 | Fuertinger et al. |
| 2019/0027064 A1 | 1/2019 | Nelson et al. |
| 2019/0064520 A1 | 2/2019 | Christensen |
| 2019/0103173 A1 | 4/2019 | Power et al. |
| 2019/0103174 A1 | 4/2019 | Power et al. |
| 2019/0134289 A1 | 5/2019 | Pudil et al. |
| 2019/0231437 A1 | 8/2019 | Sankaran et al. |
| 2019/0247124 A1 | 8/2019 | Sankaran et al. |
| 2019/0251230 A1 | 8/2019 | Fernandez |
| 2019/0251354 A1 | 8/2019 | Cork et al. |
| 2019/0279524 A1 | 9/2019 | Stoyanov et al. |
| 2019/0279765 A1 | 9/2019 | Giataganas et al. |
| 2019/0287668 A1 | 9/2019 | Tiwari et al. |
| 2019/0351121 A1 | 11/2019 | Akonur et al. |
| 2020/0118677 A1 | 4/2020 | Giataganas et al. |
| 2020/0126632 A1 | 4/2020 | Schappacher-Tilp et al. |
| 2020/0160057 A1 | 5/2020 | Roxas et al. |
| 2020/0164131 A1* | 5/2020 | Musca ............... A61M 1/1613 |
| 2020/0221990 A1 | 7/2020 | Chiofolo et al. |
| 2020/0233485 A1 | 7/2020 | Chan et al. |
| 2020/0243193 A1 | 7/2020 | Plahey et al. |
| 2020/0294676 A1 | 9/2020 | Cherif et al. |
| 2020/0320901 A1 | 10/2020 | Benson et al. |
| 2020/0383731 A1 | 12/2020 | Sankaran et al. |
| 2020/0397972 A1 | 12/2020 | Ku et al. |
| 2021/0012866 A1 | 1/2021 | Amarasingham et al. |
| 2021/0104328 A1 | 4/2021 | Baronov et al. |
| 2021/0128254 A1 | 5/2021 | Geric et al. |
| 2021/0151200 A1 | 5/2021 | Cocks et al. |
| 2021/0201699 A1 | 7/2021 | Eggert et al. |
| 2021/0228094 A1 | 7/2021 | Grady et al. |
| 2023/0020925 A1* | 1/2023 | Cox ....................... G16H 10/60 |

FOREIGN PATENT DOCUMENTS

| | | |
|---|---|---|
| CN | 205451561 U | 8/2016 |
| CN | 207458427 U | 6/2018 |
| CN | 208126709 U | 11/2018 |
| CN | 208922601 U | 5/2019 |
| CN | 113129720 A | 7/2021 |
| JP | 2004-321357 A | 11/2004 |
| JP | 2005-114764 A | 4/2005 |
| JP | 2007-029705 A | 2/2007 |
| JP | 2010-259525 A | 11/2010 |
| JP | 2020-034833 A | 3/2020 |
| TW | 201421436 A | 6/2014 |
| WO | WO 09/088308 A2 | 7/2009 |
| WO | WO 2014/100687 A2 | 6/2014 |
| WO | WO 2014/113186 A1 | 7/2014 |
| WO | WO 2015/027286 A1 | 3/2015 |
| WO | WO 2015/187616 A1 | 12/2015 |
| WO | WO 2016/089753 A1 | 6/2016 |
| WO | WO 2016/100875 A2 | 6/2016 |
| WO | WO 2016/102571 A1 | 6/2016 |
| WO | WO 2017/043440 A1 | 3/2017 |
| WO | WO 2018/126254 A1 | 7/2018 |
| WO | WO 2018/149858 A1 | 8/2018 |
| WO | WO 2021/023574 A1 | 2/2021 |
| WO | WO 2021/115835 A1 | 6/2021 |

* cited by examiner

General Prescription Treatment File

Device Information

Device ID: OPSA8170  Device Version: 3.0.1

General

Treatment ID: 7aba0ce4761845b8ab77d  Prescription ID: 7578883016116 70ED001C

Prescription Type: Standard PD-Plus ∨  Patient ID: 75788830000000020000

Patient Limits

Max VIP: 2200000  Residual VIP: 700000

Additional drain: Yes (with sound) ∨  Drain Characteristic: 350

Smart dwell factor drain: 15  Smart fill factor: 18

Permited drain rate: 230  Permited fill rate: 350

Paediatric: ☐

General   Prescription   Treatment   File

Phases (count=11) [Add cycle] [Delete all cycles]

| CycleNo | CycleSubNo | Cycle type | Group | Phase type | Phase duration |
|---|---|---|---|---|---|
| 65535 | 65535 | Initial Drain ⌄ | 0 | Initial Drain ⌄ | 300 |
| 1 | 65535 | PD=Plus ⌄ | 1 | Fill ⌄ | 497 |
| 1 | 65535 | PD=Plus ⌄ | 1 | Pause ⌄ | 10800 |
| 1 | 65535 | PD=Plus ⌄ | 1 | Drain ⌄ | 738 |
| 1 | 65535 | Standard (base cycle) ⌄ | 2 | Fill ⌄ | 497 |
| 1 | 65535 | Standard (base cycle) ⌄ | 2 | Dwell ⌄ | 7200 |
| 1 | 65535 | Standard (base cycle) ⌄ | 2 | Drain ⌄ | 738 |
| 1 | 65535 | Standard (base cycle) ⌄ | 3 | Fill ⌄ | 497 |
| 2 | 65535 | Standard (base cycle) ⌄ | 3 | Dwell ⌄ | 7200 |
| 2 | 65535 | Standard (base cycle) ⌄ | 3 | Last Drain ⌄ | 738 |
| 2 | 65535 | Last Fill ⌄ | 4 | Last Fill ⌄ | 497 |

| Phase volume | Solution Id | Flowrate | X | Y |
|---|---|---|---|---|
| -707692 | No solution | 230 | 300 | 707692 |
| 2000000 | CAPD/DPCA4 | 350 | 797 | 2000000 |
| 0 | No solution | 0 | 11597 | 2000000 |
| -200000 | No solution | 230 | 12335 | 0 |
| 2000000 | balance 4.25% 1.25Ca | 350 | 12832 | 2000000 |
| 0 | No solution | 0 | 20032 | 2000000 |
| -200000 | No solution | 230 | 20770 | 0 |
| 2000000 | balance 4.25% 1.25Ca | 350 | 21267 | 2000000 |
| 0 | No solution | 0 | 28467 | 2000000 |
| -200000 | No solution | 230 | 29205 | 0 |
| 2000000 | No solution | 350 | 29702 | 2000000 |

General  Prescription  Treatment  File

Treatment information

Start time:                      Optimized dwell:    Optimized fill:
2021-06-18T21:38:30              0                   0

Phases (count = 15)  From prescribed  New

| Phase | Sub-phase | Type | Flowrate [mL/min] | Duration [s] | Volume [uL] |
|---|---|---|---|---|---|
| 0 | 0 | Initial Drain | 8 | 38 | -3745 |
| 1 | 0 | Fill | 14 | 106 | 17803 |
| 1 | 1 | Fill | 0 | 1223 | 0 |
| 1 | 2 | Fill | 0 | 42 | 0 |
| 2 | 0 | PD-Plus Pause | 0 | 44 | 0 |
| 3 | 0 | Drain | 0 | 42 | 0 |
| 4 | 0 | Fill | 0 | 38 | 0 |
| 5 | 0 | Dwell | 0 | 14 | 0 |
| 6 | 0 | Drain | 0 | 38 | 0 |
| 7 | 0 | Fill | 0 | 38 | 0 |
| 8 | 0 | Dwell | 0 | 17 | 0 |
| 9 | 0 | Last Drain | 0 | 41 | 0 |
| 9 | 1 | Last Drain | 0 | 46 | 0 |

Summary Phases (count = 11) [Update]

| Phase | Type | Flowrate [mL/min] | Duration [s] | Volume [μL] | X | Y |
|---|---|---|---|---|---|---|
| 0 | Initial Drain | 8 | 38 | -3745 | 38 | 0 |
| 1 | Fill | 8 | 1371 | 17803 | 1409 | 17803 |
| 2 | PD-Plus Pause | 0 | 44 | 0 | 1453 | 17803 |
| 3 | Drain | 0 | 42 | 0 | 1495 | 17803 |
| 4 | Fill | 0 | 38 | 0 | 1533 | 17803 |
| 5 | Dwell | 0 | 14 | 0 | 1547 | 17803 |
| 6 | Drain | 0 | 38 | 0 | 1585 | 17803 |
| 7 | Fill | 0 | 38 | 0 | 1623 | 17803 |
| 8 | Dwell | 0 | 17 | 0 | 1640 | 17803 |
| 9 | Last Drain | 1 | 127 | -1210 | 1767 | 16593 |
| 10 | Last Fill | 33 | 40 | 5559 | 1807 | 22152 |

Mitigations (count = 3) [New]

| Code | Timestamp | Phase | Sub-phase | Status | |
|---|---|---|---|---|---|
| G100 ⌄ | 2021-06-18T21:49:25 | 1 | 0 | Displayed ⌄ | Delete |
| G100 ⌄ | 2021-06-18T22:00:16 | 1 | 0 | Displayed ⌄ | Delete |
| G155 ⌄ | 2021-06-18T22:09:09 | 65535 | 65535 | Displayed ⌄ | Delete |

Interactions (count = 6) [New]

| Reason | Phase | Sub-phase | Result | |
|---|---|---|---|---|
| PRESSURE ⌄ | 0 | 0 | Skip ⌄ | Delete |
| PRESSURE ⌄ | 1 | 0 | Continue ⌄ | Delete |
| DRAINAGE LINE ⌄ | 1 | 1 | Continue ⌄ | Delete |
| OK ⌄ | 9 | 0 | Continue ⌄ | Delete |
| OK ⌄ | 9 | 1 | Continue ⌄ | Delete |
| OK ⌄ | 9 | 2 | Skip ⌄ | Delete |

Statistics [Update]

| Parameter | Performed | Prescribed |
|---|---|---|
| Initial drain volume [μl] | 3745 | 707692 |
| Fill volume [μl] | 23362 | 8000000 |
| Drain volume [μl] | -1210 | -6000000 |
| Duration [s] | 1807 | 29702 |
| Inflow rate [mL/min] | 7 | 241 |
| Outflow rate [mL/min] | 2 | 126 |

| | |
|---|---|
| End date: | 2021-06-18T22-08:37 |
| Completed: | ☑ |
| Inflow reduction: | 0 |
| Dwell reduction: | 0 |
| Balance: | 16593 |
| UF: | 0 |

| General | Prescription | Treatment | File |

```xml
<?xml version='1.0' encoding='utf-8' standalone='no'?>
<treatment_report crc_32="74367cea" interface_version="1.0">
<id>7aba0ce4761845b8ab77d9e28e63412</id>
<device id="OPSA8170" version="3.0.1"/>
<prescription>
  <id>7578883016116700ED0010000000001E0</id>
  <patient_id>7578883000000000200000000000002D</patient_id>
  <model_id>3</model_id>
  <max_vip>2200000</max_vip>
  <rvip>700000</rvip>
  <additional_drain>1</additional_drain>
  <smart_dwell_factor>15</smart_dwell_factor>
  <smart_fill_factor>18</smart_fill_factor>
  <drain_characteristic>350</drain_characteristic>
  <permitted_drain_rate>230</permitted_drain_rate>
  <permitted_fill_rate>350</permitted_fill_rate>
```

```xml
</prescription>
<treatment>
<start year="2021" month="6" day="18" hour="21" min="38" sec="30"/>
<optimized_dwell>0</optimized_dwell>
<optimized_fill>0</optimized_fill>
<phase count="15">
  <item phase="0" sub_phase="0">
    <spot flowrate="8" phase_dur="38" phase_vol="-3745" type="7" x="38" y="3745"/>
    <result interaction="2" phase="3" reason="2007"/>
    <duration cleanup="0" idle="3" prepare="7" treatment="28"/>
  </item>
  <item phase="1" sub_phase="0">
    <spot flowrate="14" phase_dur="106" phase_vol="17803" type="2" x="144" y="17803"/>
    <result interaction="1" phase="2" reason="2007"/>
    <duration cleanup="0" idle="19" prepare="11" treatment="76"/>
```

```
<mitigations counts="3">
<miti year="2021" month="6" day="18" hour="21" min="49" sec="25" phase="1" sub_phase="0"
code="53" status="0"/>
<miti year="2021" month="6" day="18" hour="22" min="0" sec="16" phase="1" sub_phase="0"
code="53" status="0"/>
<miti year="2021" month="6" day="18" hour="22" min="9" sec="9" phase="65535" sub_phase="65535"
code="70" status="0"/>
</mitigations>
<interactions count="6">
<event phase="0" sub_phase="0" reason="2007" result="2"/>
<event phase="1" sub_phase="0" reason="2007" result="1"/>
<event phase="1" sub_phase="1" reason="2009" result="1"/>
<event phase="9" sub_phase="0" reason="0" result="1"/>
<event phase="9" sub_phase="1" reason="0" result="1"/>
<event phase="9" sub_phase="2" reason="0" result="2"/>
```

* Fri Jun 18, 2021 10:08 PM

Treatment Overview

Summary

| | Prescribed | Performed |
|---|---|---|
| Treatment Volume | 8,000 mL | → 23 mL |
| Total Outflow Volume | 6,000 mL | 1 mL |
| Initial Outflow Volume | 708 mL | 4 mL |
| Last Inflow Volume | 2,000 mL | 6 mL |
| # of Interruptions (Alarms/Cautions) | – | 9(3/8) |
| Total Ultrafiltration | – | –17 mL |
| Cycler Machine | | |
| Cycler Model | sleep safe harmony | |

Treatment Duration (hh.mm)
Total Dwell Duration (hh.mm)
# of Cycles
Start Time
Stop Time Convert to mL >> round to two digit ?? multiply by −1 = −17

Data Delivery Method

DIALYSIS TREATMENT FILE SIMULATION AND VERIFICATION SYSTEM

BACKGROUND

Dialysis treatment files may include information describing a dialysis treatment for a patient. For instance, the file may include prescription information indicating a dialysis prescription that is unique to the patient. The file may further include treatment information indicating information such as alarms or interactions that occurred during the dialysis treatment. However, generally, creating the treatment files by having to run the dialysis treatment takes a significant amount of time. Accordingly, there remains a technical need for a reliable method to improve the testing and the verification of systems that use dialysis treatment files.

SUMMARY

This summary is provided to introduce a selection of concepts in a simplified form that are further described below. This summary is not intended to necessarily identify key features or essential features of the present disclosure. The present disclosure may include the following various aspects and embodiments.

In an exemplary embodiment, the present disclosure provides a system comprising a dialysis treatment machine comprising a compartment storing dialysate and a patient line coupled to an actual patient, wherein the dialysis treatment machine is configured to perform a dialysis treatment for the actual patient; an external device; and a simulation server configured to: receive an existing dialysis treatment file associated with performing the dialysis treatment for the actual patient, wherein the existing dialysis treatment file comprises existing dialysis treatment information; obtain patient information for a simulated dialysis treatment of a simulated patient; obtain dialysis prescription information for the simulated dialysis treatment; modify the existing dialysis treatment information for the simulated dialysis treatment to generate modified dialysis treatment information; generate a dialysis treatment file for the simulated dialysis treatment of the simulated patient based on the patient information, the dialysis prescription information, and the modified dialysis treatment information, wherein the dialysis treatment file is in a data format compatible with a dialysis treatment application; and send the dialysis treatment file to the external device. The external device is configured to: store the dialysis treatment file from the simulation server. The system further comprises a dialysis treatment file computing device configured to: retrieve the dialysis treatment file from the external device; input the dialysis treatment file into the dialysis treatment application to convert the dialysis treatment file into a user interface indicating simulated results of the simulated dialysis treatment; and display the user interface indicating the simulated results of the simulated dialysis treatment.

In some instances, the modified dialysis treatment information indicates stages of the simulated dialysis treatment for the simulated patient and alarms that occurred during the simulated dialysis treatment.

In some examples, the modified dialysis treatment information further indicates simulated user interactions during the simulated dialysis treatment and statistics associated with the simulated dialysis treatment.

In some variations, the dialysis prescription information indicates a dialysis prescription for the simulated patient.

In some instances, the patient information indicates a type of dialysis device used for the simulated dialysis treatment.

In some examples, the dialysis treatment machine is a peritoneal dialysis machine, wherein the external device is a patient card reader, wherein the patient treatment file is configured to accept input of a patient card, and wherein the patient card reader is configured to store the dialysis treatment file from the simulation server by storing the dialysis treatment file on the patient card.

In another exemplary embodiment, the present disclosure provides a method, comprising: obtaining general patient information for a simulated dialysis treatment of a simulated patient; obtaining dialysis prescription information for the simulated dialysis treatment; obtaining dialysis treatment information for the simulated dialysis treatment; generating a dialysis treatment file for the simulated dialysis treatment of the simulated patient based on the general patient information, the dialysis prescription information, and the dialysis treatment information, wherein the dialysis treatment file is in a data format compatible with a dialysis treatment application; inputting the dialysis treatment file into the dialysis treatment application to convert the dialysis treatment file into a user interface indicating simulated results of the simulated dialysis treatment; and displaying the user interface indicating the simulated results of the simulated dialysis treatment.

In some instances, the dialysis treatment information indicates stages of the simulated dialysis treatment for the simulated patient and alarms that occurred during the simulated dialysis treatment.

In some examples, the dialysis treatment information further indicates simulated user interactions during the simulated dialysis treatment and statistics associated with the simulated dialysis treatment.

In some variations, the dialysis prescription information indicates a dialysis prescription for the simulated patient.

In some instances, the general patient information indicates a type of dialysis device used for the simulated dialysis treatment.

In some examples, the method further comprises: storing, by a first computing device of the system, the dialysis treatment file into an external device; and retrieving, by a second computing device of the system, the dialysis treatment file from the external device.

In some instances, the external device is a patient card reader comprising a memory that stores the generated dialysis treatment file.

In some variations, generating the dialysis treatment file comprises generating, by the first computing device, the dialysis treatment file, inputting the dialysis treatment file into the dialysis treatment application comprises, inputting, by the second computing device, the dialysis treatment file into the dialysis treatment application, and the first computing device is separate from the second computing device.

In some instances, the method further comprises: receiving, from a medical system, an existing dialysis treatment file associated with performing a dialysis treatment on an actual patient, the existing dialysis treatment file comprises existing dialysis treatment information, and obtaining the dialysis treatment information comprises modifying the existing dialysis treatment information.

In some examples, the medical system is a peritoneal dialysis machine.

In some variations, the medical system is a hemodialysis machine.

In yet another embodiment, the present disclosure provides one or more non-transitory computer-readable mediums having processor-executable instructions stored thereon, wherein the processor-executable instructions, when executed, facilitate: obtaining general patient information for a simulated dialysis treatment of a simulated patient; obtaining dialysis prescription information for the simulated dialysis treatment; obtaining dialysis treatment information for the simulated dialysis treatment; generating a dialysis treatment file for the simulated dialysis treatment of the simulated patient based on the general patient information, the dialysis prescription information, and the dialysis treatment information, wherein the dialysis treatment file is in a data format compatible with a dialysis treatment application; storing the dialysis treatment file into an external device; after retrieving the dialysis treatment file from the external device, inputting the dialysis treatment file into the dialysis treatment application to convert the dialysis treatment file into a user interface indicating simulated results of the simulated dialysis treatment; and causing display of the user interface indicating the simulated results of the simulated dialysis treatment.

In some instances, the dialysis treatment information indicates stages of the simulated dialysis treatment for the simulated patient and alarms that occurred during the simulated dialysis treatment.

In some examples, the dialysis treatment information further indicates simulated user interactions during the simulated dialysis treatment and statistics associated with the simulated dialysis treatment.

Further features and aspects are described in additional detail below with reference to the FIGs.

BRIEF DESCRIPTION OF THE DRAWINGS

FIG. 5 shows an exemplary user interface for inputting information that is used to generate the dialysis treatment file according to one or more examples of the present application.

FIGS. 6A and 6B show another exemplary user interface for inputting information that is used to generate the dialysis treatment file according to one or more examples of the present application.

FIGS. 7A-7D show exemplary user interfaces for inputting information that is used to generate the dialysis treatment file according to one or more examples of the present application.

FIGS. 8A-8C show exemplary user interfaces for displaying a simulated dialysis treatment file according to one or more examples of the present application.

FIGS. 9A-9D show exemplary user interfaces for displaying the simulated dialysis treatment file in an enterprise software application according to one or more examples of the present application.

DETAILED DESCRIPTION

Exemplary embodiments of the present application provide for generating a simulated dialysis treatment file and verification of the simulated dialysis treatment file as well as verifying a software application that uses dialysis treatment files. For example, dialysis treatment files may be generated for dialysis treatments of patients. For instance, prior to and/or after the completion of the dialysis treatment, a dialysis file may be generated for the patient. The dialysis treatment file may include information such as general information, prescription information, and/or treatment information. However, creating a dialysis treatment file may take a considerable amount of time considering that certain information from the dialysis treatment file (e.g., the treatment information indicating events that occur during the dialysis treatment) is only able to be obtained after the completion of the dialysis treatment.

Additionally, certain systems (e.g., applications) may use and display information associated with the dialysis treatment file. These systems may require numerous dialysis treatment files so that they can test and ensure that the systems work as expected under expected real-world conditions. As such, the present disclosure provides a time-saving, effort saving, and resource saving method and environment to test and verify dialysis treatment files and/or systems that use dialysis treatment files. For instance, the present disclosure provides an interface that a user may use to input information. A device may quickly generate a plurality of dialysis treatment files based on the user input (e.g., without having to perform the dialysis treatment each time). Afterwards, the device or a separate device may use the generated dialysis treatment files to test and verify a system is working properly (e.g., showing the alarms and other information from the dialysis treatment file). Thus, instead of having to perform a dialysis treatment each time, the present disclosure provides a time saving method and environment to test and verify dialysis treatment files as well as test and verify systems that use the treatment files. Additionally, and/or alternatively, the present disclosure may be used to provide support for new device releases.

Figure 1A:
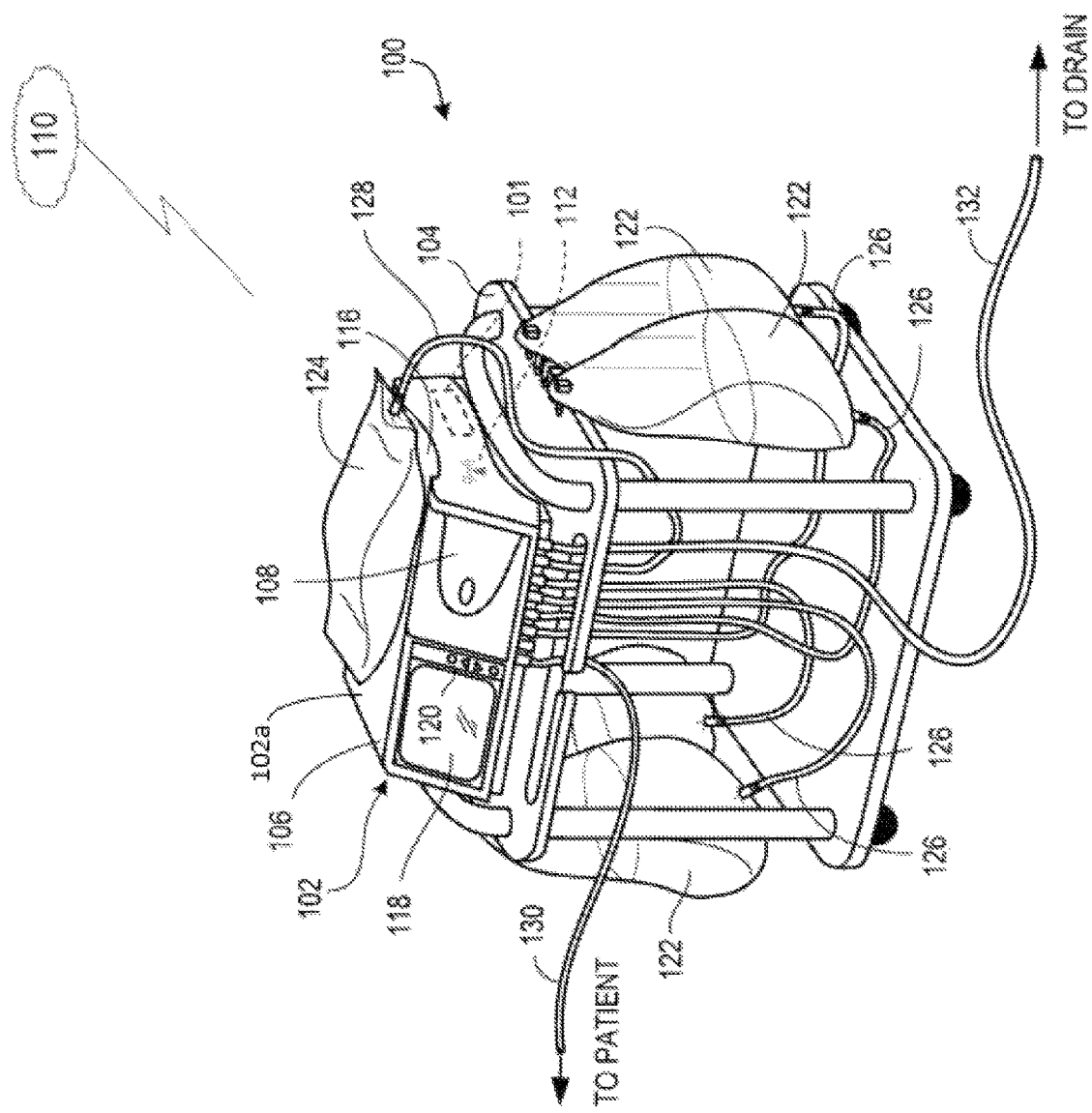
FIG. 1A is a schematic diagram of an exemplary medical treatment system according to one or more examples of the present application.
Figure 1B:
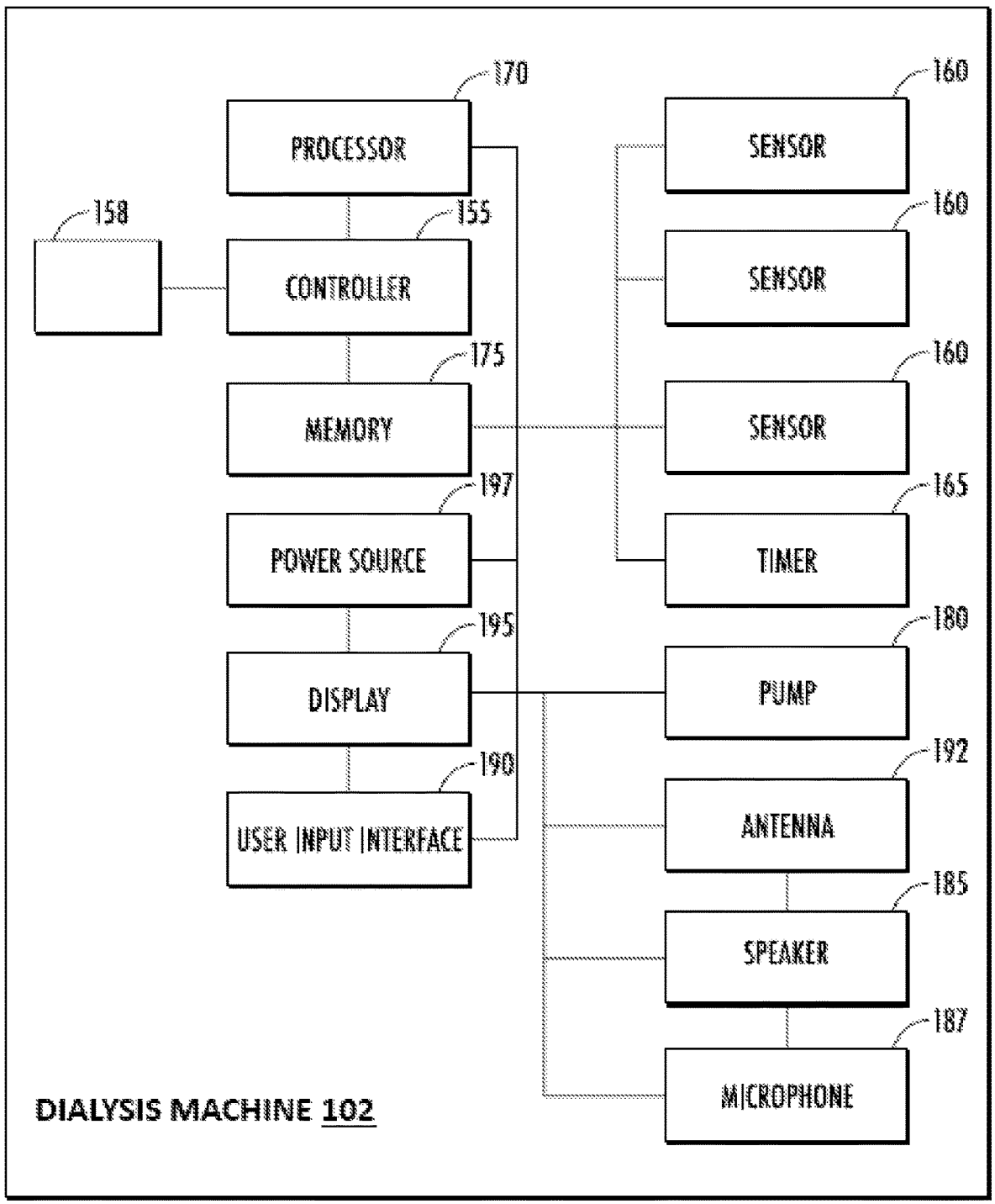
FIG. 1B is another schematic diagram of an exemplary medical treatment system according to one or more examples of the present application.

FIGS. 1A and 1B are schematic diagrams of an exemplary medical system (e.g., a dialysis system) according to one or more examples of the present application. By way of example, the medical system shown in FIG. 1A is a peritoneal dialysis system; however, other medical systems are contemplated herein. For instance, the principles discussed herein (e.g., generating dialysis treatment files) may be applicable a particular peritoneal dialysis system such as the SLEEPSAFE HARMONY CYCLER and/or the LIBERTY CYCLER, both manufactured by FRESENIUS MEDICAL CARE. Additionally, and/or alternatively, the principles discussed herein may be applicable to other dialysis systems such as hemodialysis systems and/or other medical systems.

In particular, FIG. 1A shows an example of a medical system, implemented as a peritoneal dialysis (PD) system 100, that is configured for use in accordance with an exemplary implementation of the system described herein. In some implementations, the PD system 100 may be configured for use at a patient's home (e.g., a home dialysis system). The PD system 100 may include a dialysis machine 102 (e.g. a PD machine, also referred to as a PD cycler)

which in some embodiments may be seated on a cart 104. The dialysis machine 102 may include a housing 106, a door 108, and a cartridge interface for contacting a disposable PD cassette, or cartridge, when the cartridge is disposed within a compartment formed between the cartridge interface and the closed door 108. A heater tray 116 may be positioned on top 102a of the housing 106. The heater tray 116 may be any size and shape to accommodate a bag of dialysate (e.g., a 5 L bag of dialysate). The dialysis machine 102 may also include a user interface such as a touch screen 118 and control panel 120 operable by a user (e.g., a caregiver or a patient) to allow, for example, set up, initiation, and/or termination of a PD treatment.

Dialysate bags 122 may be suspended from the sides of the cart 104, and a heater bag 124 may be positioned in the heater tray 116. Hanging the dialysate bags 122 may improve air management as any air is disposed by gravity to a top portion of the dialysate bag 122. Valves may be attached to a bottom portion of the dialysate bags 122 so fluid is drawn out and air delivery is minimized. Dialysate from the dialysate bags 122 may be transferred to the heater bag 124 in batches. For example, a batch of dialysate may be transferred from the dialysate bags 122 to the heater bag 124, where the dialysate is heated by the heating element. When the batch of dialysate has reached a predetermined temperature (e.g., approximately 98°-100° F., 37° C.), the batch of dialysate may be flowed into the patient. The dialysate bags 122 and the heater bag 124 may be connected to the cartridge via dialysate bag lines 126 and a heater bag line 128, respectively. The dialysate bag lines 126 may be used to pass dialysate from dialysate bags 122 to the cartridge during use, and the heater bag line 128 may be used to pass dialysate back and forth between the cartridge and the heater bag 124 during use. In addition, a patient line 130 (e.g., a tubing connected to the patient) and a drain line 132 may be connected to the cartridge. The patient line 130 may be connected to a patient's abdomen via a catheter and may be used to pass dialysate back and forth between the cartridge and the patient's peritoneal cavity during use. The drain line 132 may be connected to a drain or drain receptacle and may be used to pass dialysate from the cartridge to the drain or drain receptacle during use.

The touch screen 118 and the control panel 120 may allow a user to input various treatment parameters to the dialysis machine 102 and to otherwise control the dialysis machine 102. In addition, the touch screen 118 may serve as a display. The touch screen 118 may function to provide information to the patient and the operator of the PD system 100. For example, the touch screen 118 may display information related to a dialysis treatment to be applied to the patient, including information related to a prescription. In various embodiments, the control panel 120 may also include audio and video component capabilities, including speakers, microphones and/or cameras.

The dialysis machine 102 may include a processing module 101 that resides inside the dialysis machine 102, the processing module 101 being configured to communicate with the touch screen 118 and the control panel 120. The processing module 101 may be configured to receive data from the touch screen 118 the control panel 120 and sensors, e.g., temperature and pressure sensors, and control the dialysis machine 102 based on the received data. For example, the processing module 101 may adjust the operating parameters of the dialysis machine 102.

The dialysis machine 102 may be configured to connect to a network 110. The connection to network 110 may be via a wireless connection, such as via WIFI or BLUETOOTH, or in some cases a non-wireless connection, as further discussed elsewhere herein. The dialysis machine 102 may include a connection component 112 configured to facilitate the connection to the network 110. The connection component 112 may be a transceiver for wireless connections and/or other signal processor for processing signals transmitted and received over a wired connection. In the case of a wired connection, the connection component 112 may be a port enabling a physical connection to a network component. Other medical devices (e.g., other dialysis machines) or components may be configured to connect to the network 110 and communicate with the dialysis machine 102.

Although discussed herein principally in connection with a peritoneal dialysis machine, the system described herein may be used and implemented in connection with other types of medical devices having one or more displays, including hemodialysis machines and/or other medical devices (e.g., home hemodialysis machines and/or other medical machines).

FIG. 1B is a schematic illustration of an exemplary embodiment of a dialysis machine such as, for example, the dialysis machine 102 that is configured for use in accordance with the present disclosure. The machine 102 may be a home dialysis machine, e.g., a PD machine, for performing a dialysis treatment on a patient, and may be included in the system 100 described above. A controller 155, that may be a component of the processing module 101, may automatically control execution of a treatment function during a course of dialysis treatment. The controller 155 may be operatively connected to the sensors 160 and deliver a signal to execute a treatment function or a course of treatment associated with various treatment systems. In some embodiments, a timer 165 may be included for timing triggering of the sensors 160.

In some embodiments, the machine 102 may also include a processor 170, and memory 175, the controller 155, the processor 170, and/or the memory 175, or combinations thereof, that may separately or collectively part of the processing module 101, that may receive signals from the sensor(s) 160 indicating various parameters. Each fluid bag (e.g., the dialysate bags 122) may contain an approximate amount of dialysate, such that "approximate amount" may be defined as a 3 liter (L) fluid bag containing 3000 to 3150 milliliters (mL), a 5 L fluid bag containing 5000 to 5250 mL, and a 6 L fluid bag containing 6000 to 6300 mL. The controller 155 may also detect connection of all fluid bags 122 connected.

Communication between the controller 155 and the treatment system may be bi-directional, whereby the treatment system acknowledges control signals, and/or may provide state information associated with the treatment system and/or requested operations. For example, system state information may include a state associated with specific operations to be executed by the treatment system (e.g., trigger pumps and/or compressors to deliver dialysate and the like) and a status associated with specific operations (e.g., ready to execute, executing, completed, successfully completed, queued for execution, waiting for control signal, and the like).

In some embodiments, the dialysis machine 102 may include at least one pump 180 operatively connected to the controller 155. During a treatment operation, the controller 155 may control the pump 180 for pumping fluid, e.g., fresh and spent dialysate, to and from a patient. For example, the pump 180 may transfer dialysate from the dialysate bag 122 through, for example, a cassette insertable into a port formed in the dialysis machine, to the heating chamber 152 prior to transferring the dialysis to the patient. In an embodiment, the pump 180 may be a peristaltic pump. The controller 155 may also be operatively connected to a speaker 185 and a microphone 187 disposed in the machine 102. A user input interface 190 may include a combination of hardware and software components that allow the controller 155 to communicate with an external entity, such as a patient, caregiver or other user. These components may be configured to receive information from actions such as physical movement or gestures and verbal intonation. In some embodiments, the components of the user input interface 190 may provide information to external entities. Examples of the components that may be employed within the user input interface 190 include keypads, buttons, microphones, touch screens, gesture recognition devices, display screens, and speakers. The machine 102 may also be wirelessly connectable via an antenna 192 for remote communication that may be a part of the connection component 112. The machine 102 may also include a display 195 and a power source 197.

The sensors 160 may be included for monitoring parameters and may be operatively connected to at least the controller 155, the processor 170, and/or the memory 175, or combinations thereof. The processor 170 may be configured to execute an operating system, which may provide platform services to application software, e.g., for operating the dialysis machine 102. These platform services may include inter-process and network communication, file system management and standard database manipulation. One or more of many operating systems may be used, and examples are not limited to any particular operating system or operating system characteristic.

The memory 175 may include a computer readable and writeable nonvolatile data storage medium configured to store non-transitory instructions and data. In addition, the memory 175 may include a processor memory that stores data during operation of the processor 170. In some examples, the processor memory includes a relatively high performance, volatile, random access memory such as dynamic random-access memory (DRAM), static memory (SRAM), or synchronous DRAM. However, the processor memory may include any device for storing data, such as a non-volatile memory, with sufficient throughput and storage capacity to support the functions described herein. Further, examples are not limited to a particular memory, memory system, or data storage system.

The instructions stored on the memory 175 may include executable programs or other code that may be executed by the processor 170. The instructions may be persistently stored as encoded signals, and the instructions may cause the processor 170 to perform the functions described herein. The memory 175 may include information that is recorded, on or in, the medium, and this information may be processed by the processor 170 during execution of instructions. The memory 175 may also include, for example, specification of data records for user timing requirements, timing for treatment and/or operations, historic sensor information, and the like. The medium may, for example, be optical disk, magnetic disk or flash memory, among others, and may be permanently affixed to, or removable from, the controller 155.

The sensor(s) 160 may include a pressure sensor for monitoring fluid pressure of the machine 102, although the sensors 160 may also include any of a heart rate sensor, a respiration sensor, a temperature sensor, a weight sensor, an air sensor, a video sensor, a thermal imaging sensor, an electroencephalogram sensor, a motion sensor, an audio sensor, an accelerometer, a capacitance sensor, or any other suitable sensor. It is appreciated that the sensors 160 may include sensors with varying sampling rates, including wireless sensors.

The controller 155 may be disposed in the machine 102 or may be coupled to the machine 102 via a communication port or wireless communication links, shown schematically as communication element 158 that may be a part of the connection component 112. According to various examples, the communication element 158 may support a variety of one or more standards and protocols, examples of which include wireless and/or non-wireless communication, such as USB, Wi-Fi, TCP/IP, Ethernet, Bluetooth, among others. As a component disposed within the machine 102, the controller 155 may be operatively connected to any of the sensors 160, the pump 180, and the like. The controller 155 may communicate control signals or triggering voltages to the components of the machine 102. As discussed, exemplary embodiments of the controller 155 may include wireless communication interfaces. The controller 155 may detect remote devices to determine if any remote sensors are available to augment any sensor data being used to evaluate the patient.

It will be appreciated that the medical system depicted in FIGS. 1A and 1B is merely exemplary. The principles discussed herein may be applicable to other medical systems.

Figure 2:
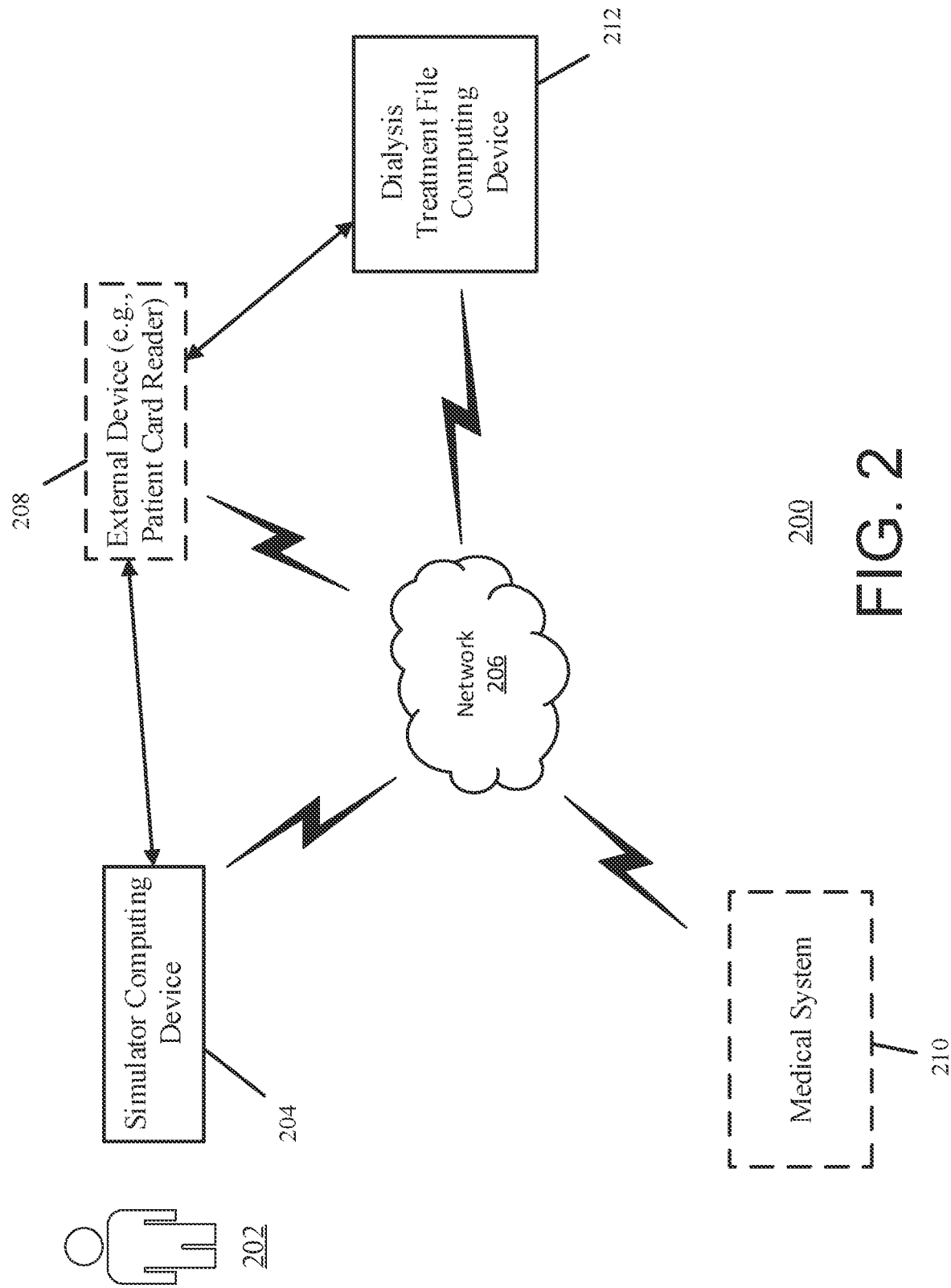
FIG. 2 is a simplified block diagram depicting an exemplary computing environment in accordance with one or more examples of the present application according to one or more examples of the present application.

FIG. 2 is a simplified block diagram depicting an exemplary computing environment in accordance with one or more examples of the present application. The environment 200 includes a user (e.g., an operator) 202, a simulator computing device 204 associated with the user 202, an external device 208 (e.g., a patient card reader), a medical system 210, and a dialysis treatment file computing device 212. Although the entities within environment 200 may be described below and/or depicted in the FIGs. as being singular entities, it will be appreciated that the entities and functionalities discussed herein may be implemented by and/or include one or more entities.

The entities within the environment 200 such as the simulator computing device 204, the external device 208, the medical system 210, and the dialysis treatment file computing device 212 may be in communication with other systems within the environment 200 via the network 206. The network 206 may be a global area network (GAN) such as the Internet, a wide area network (WAN), a local area network (LAN), or any other type of network or combination of networks. The network 206 may provide a wireline, wireless, or a combination of wireline and wireless communication between the entities within the environment 200.

In some instances, one or more entities within environment 200 may be in electrical communication with each other without using the network 206. For instance, the simulator computing device 204 as well as the dialysis treatment file computing device 212 may be in electrical communication with the external device 208 without using the network 206.

The medical system 210 is denoted in a dashed box to indicate that the medical system 210 is optional within the environment 200. When present, the medical system 210 may be the medical system depicted in FIGS. 1A and 1B and/or another medical system (e.g., the medical system 210 may be or include a dialysis/hemodialysis/peritoneal dialysis machine that performs dialysis treatment). The medical system 210 may provide and/or receive information from other entities within the environment 200. For instance, the medical system 210 may perform dialysis treatment for a patient and provide a dialysis treatment file to the simulator computing device 204 and/or other entities within environment 200.

The external device 208 (e.g., a patient card reader) is denoted in a dashed box to indicate that the external device 208 is optional within the environment 200. When present, the external device 208 stores dialysis treatment files such as the generated dialysis treatment files from the simulator computing device 204. Additionally, and/or alternatively, the external device 208 provides the stored dialysis treatment files back to the simulator computing device 204 and/or to the dialysis treatment file computing device 212. The external device 208 may be any device or storage device that includes memory capable of storing information such as dialysis treatment files. In some examples, the external device 208 is a non-transitory computer readable medium. In some variations, the external device 208 is a hard drive, flash drive, and/or a universal serial bus (USB) device.

The user 202 may operate, own, and/or otherwise be associated with a simulator computing device 204. For instance, the simulator computing device 204 may be a computing device that is operated by the user 202. The user 202 may provide information such as user input to the simulator computing device 204. The simulator computing device 204 may generate one or more dialysis treatment files based on the information provided by the user 202. The simulator computing device 204 may provide and/or store the generated simulated dialysis treatment files in the external device 208. This will be explained in further detail below.

The simulator computing device 204 may be and/or include, but is not limited to, a desktop, laptop, tablet, computing platforms, mobile device (e.g., smartphone device, or other mobile device), smart watch, an internet of things (IOT) device, or any other type of computing device that generally comprises one or more communication components, one or more processing components, and one or more memory components. The simulator computing device 204 may be able to execute software applications managed by, in communication with, and/or otherwise associated with an enterprise organization. Additionally, and/or alternatively, the simulator computing device 204 may be configured to operate a web browser. The enterprise organization may be any type of corporation, company, organization, and/or other institution. In some instances, the enterprise organization provides medical services such as dialysis treatment services.

The dialysis treatment file computing device 212 is a computing device and/or system that is associated with the enterprise organization. The dialysis treatment file computing device 212 includes one or more computing devices, computing platforms, systems, servers, and/or other apparatuses capable of performing tasks, functions, and/or other actions for the enterprise organization. In some instances, the dialysis treatment file computing device 212 may, for example, communicate with the simulator computing device 204 and/or the external device 208. For instance, the dialysis treatment file computing device 212 may retrieve the dialysis treatment file from the simulator computing device 204 and/or the external device 208. The dialysis treatment file computing device 212 may manage a software application for the enterprise organization and input the information from the dialysis treatment file into the software application to generate a user interface. The user interface may indicate results (e.g., simulated results) of the dialysis treatment associated with the patient. The dialysis treatment file computing device 212 may cause display of the user interface on a display device such as a display device included within and/or connected to the dialysis treatment file computing device 212 and/or the simulator computing device 204.

The dialysis treatment file computing device 212 may be implemented using one or more computing platforms, devices, servers, and/or apparatuses. In some variations, the dialysis treatment file computing device 212 and/or the simulator computing device 204 may be implemented as engines, software functions, and/or applications. In other words, the functionalities of the dialysis treatment file computing device 212 and/or the simulator computing device 204 may be implemented as software instructions stored in storage (e.g., memory) and executed by one or more processors.

It will be appreciated that the exemplary environment depicted in FIG. 2 is merely an example, and that the principles discussed herein may also be applicable to other situations—for example, including other types of institutions, organizations, devices, systems, and network configurations.

Figure 3:
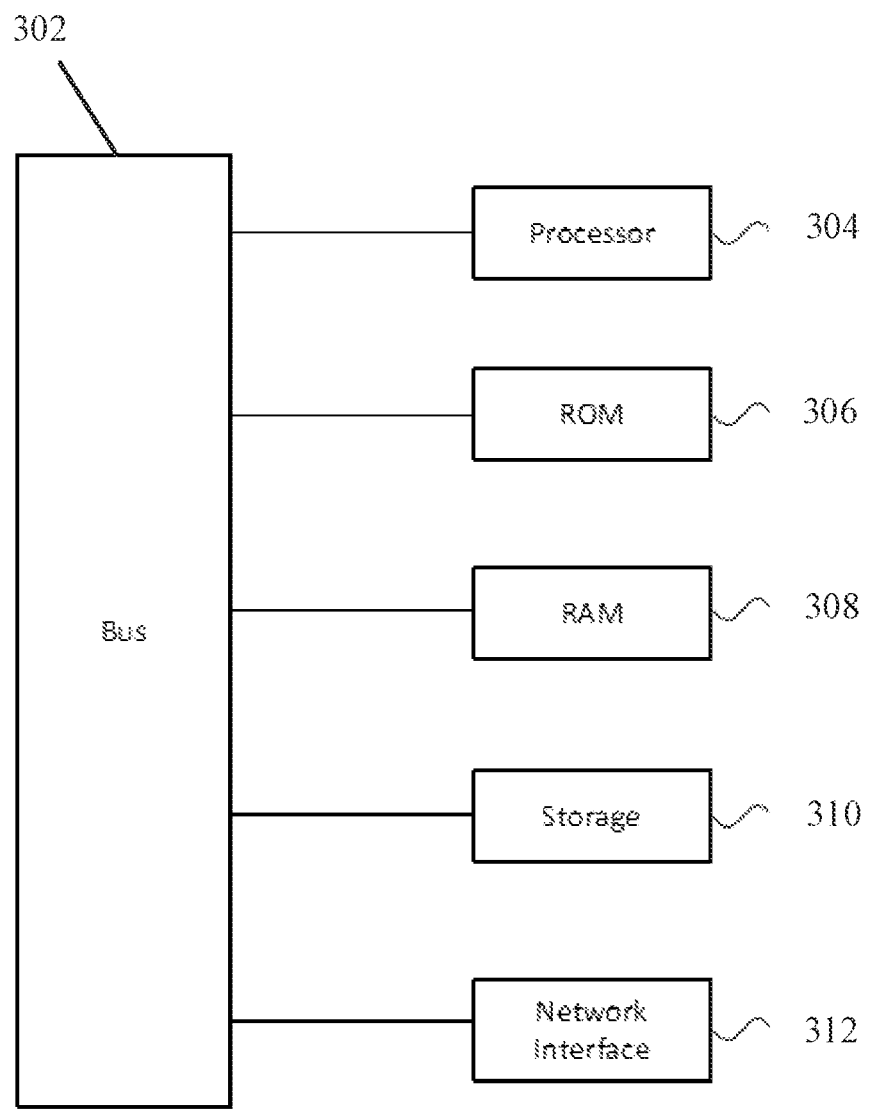
FIG. 3 is a simplified block diagram of one or more devices or systems within the exemplary environment of FIG. 2 according to one or more examples of the present application.

FIG. 3 is a simplified block diagram of one or more devices or systems within the exemplary environment of FIG. 2 according to one or more examples of the present application. For instance, the device/system 300 may be the simulator computing device 204, the external device 208, and/or the dialysis treatment file computing device 212 of FIG. 2. The device/system 300 includes a processor 304, such as a central processing unit (CPU), controller, and/or logic, that executes computer executable instructions for performing the functions, processes, and/or methods described herein. In some examples, the computer executable instructions are locally stored and accessed from a non-transitory computer readable medium, such as storage 310, which may be a hard drive or flash drive. Read Only Memory (ROM) 306 includes computer executable instructions for initializing the processor 304, while the random-access memory (RAM) 308 is the main memory for loading and processing instructions executed by the processor 304. The network interface 312 may connect to a wired network or cellular network and to a local area network or wide area network, such as the network 206. The device/system 300 may also include a bus 302 that connects the processor 304, ROM 306, RAM 308, storage 310, and/or the network interface 312. The components within the device/system 300 may use the bus 304 to communicate with each other. The components within the device/system 300 are merely exemplary and might not be inclusive of every component, server, device, computing platform, and/or computing apparatus within the device/system 300. Additionally, and/or alternatively, the device/system 300 may further include components that might not be included within every entity of environment 200.

Figure 4:
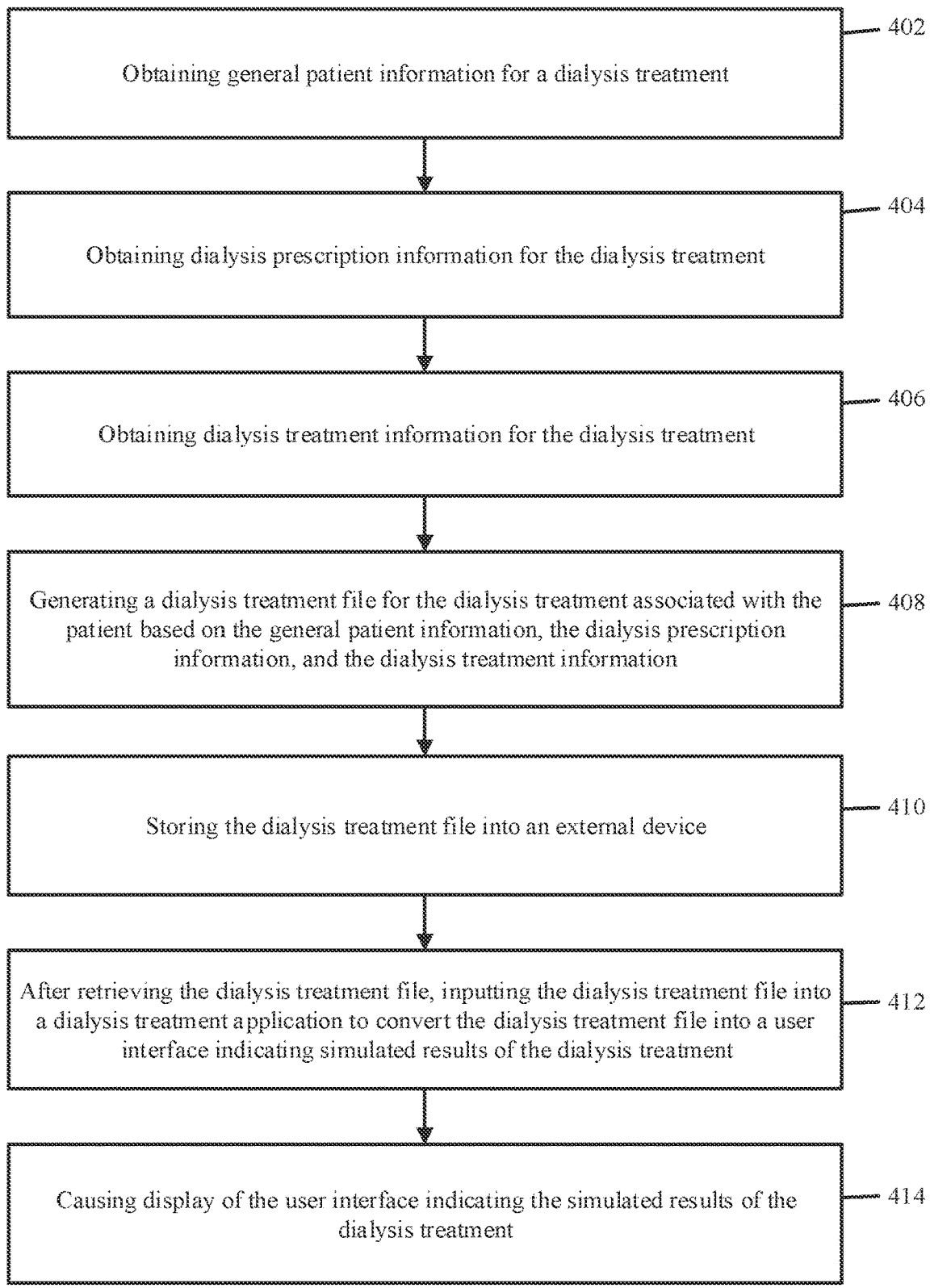
FIG. 4 is a flowchart of an exemplary process for dialysis treatment file simulation according to one or more examples of the present application.

FIG. 4 is a flowchart of an exemplary process for dialysis treatment file simulation according to one or more examples of the present application. The process may be performed by a computing device/system such as the simulator computing device 204 and/or the dialysis treatment file computing device 212. However, it will be recognized that any of the following blocks may be performed in any suitable order, and that the process 400 may be performed in any suitable environment. The descriptions, illustrations, and processes of FIG. 4 are merely exemplary and the process 400 may use other descriptions, illustrations, and processes for providing dialysis treatment training.

In operation, at block 402, the simulator computing device 204 obtains general patient information for a dialysis treatment associated with a patient. For instance, as mentioned previously, rather than having to perform the dialysis treatment on the patient, which is time-consuming, the simulator computing device 204 may generate simulated dialysis treatment files to test and verify a system or application (e.g., an enterprise system or enterprise software application operating on the dialysis treatment file computing device 212). For example, the simulator computing device 204 may operate a simulator tool and/or a simulator software application. The simulator tool and/or software application may be local to the simulator computing device 204 (e.g., without requiring access to network 206) and/or may be accessed via a web application. For instance, the simulator computing device 204 may be connected to a server component and/or a cloud computing environment that provides the functionality for generating the dialysis treatment files. In other words, the simulator tool/software application, which generates the dialysis treatment files, may be on a server component and/or a cloud computing environment that is accessible by the simulator computing device 204 (e.g., by using a web browser).

In some instances, the enterprise system or enterprise software application may be configured to monitor dialysis treatments for dialysis patients. For instance, the enterprise system or enterprise software application may be associated with a therapy management system that allows clinicians to create programs and review treatments for home dialysis machines. As such, the simulator computing device 204 may be configured to generate simulated dialysis treatment files to test or verify the enterprise system or the enterprise software application. For instance, the generated simulated dialysis treatment files may be configured to ensure certain functionalities of the therapy management system are operating properly (e.g., certain alarm codes or treatment information are displayed properly within the therapy management system).

After accessing the simulator tool/software application, the simulator computing device 204 may cause display of a user interface on a display device that permits the user 202 to provide user input information. The display device may be part of the simulator computing device 204 and/or may be separate and in electrical communication with the simulator computing device 204. FIG. 5 shows an exemplary user interface for inputting information that is used to generate the dialysis treatment file according to one or more examples of the present application. In particular, FIG. 5 shows a graphical user interface 500 that is displayed by the simulator computing device 204. The graphical user interface 500 includes a plurality of tabs at the top including a "General" tab, a "Prescription" tab, a "Treatment" tab, and a "File" tab. The graphical user interface 500 may be part of the simulator tool/application. For instance, the user 202 may input user information using the graphical user interface 500 and/or the additional graphical user interfaces described below.

For example, at block 402, the user 202 may input general patient information for a dialysis treatment using the graphical user interface 500. In particular, the user 202, using the simulator computing device 204, may provide the general patient information and the simulator computing device 204 may obtain the general patient information.

The general patient information may include device information such as information regarding a particular dialysis device such as a hemodialysis and/or a peritoneal dialysis machine that is used for the dialysis treatment. For instance, the device information may include a device identifier (ID) and a device version. The general patient information may further include general dialysis information such as a treatment ID (e.g., a dialysis treatment ID), a prescription type (e.g., a type of the prescription), a prescription ID (e.g., an identifier for the prescription), and a patient ID (e.g., an ID of a patient). The general patient information may also include patient limits (e.g., the limits of the patients during the dialysis treatment). The general patient information shown in FIG. 5 is merely exemplary and the general patient information may include additional and/or alternative information.

At block 404, the simulator computing device 204 obtains dialysis prescription information for the dialysis treatment. For instance, referring back to FIG. 5, the user 202 may select the "Prescription" tab, which shows one or more additional graphical user interfaces. FIGS. 6A and 6B show another exemplary user interface for inputting information that is used to generate the dialysis treatment file according to one or more examples of the present application. In particular, FIGS. 6A and 6B show a graphical user interface 600 that is displayed by the simulator computing device 204, and the user 202 uses the graphical user interface 600 to input dialysis prescription information for the dialysis treatment. The dialysis prescription information may include any information associated with a dialysis prescription such as a number of cycles for a dialysis treatment as well as additional information within each cycle that is to be performed during a dialysis treatment.

For example, using the simulator computing device 204, the user 202 may use the top two buttons to "Add cycle" and "Delete all cycles". Furthermore, the user 202 may use a delete function (not shown) to delete a single cycle from the added cycles. After selecting the "Add cycle" button, a dialysis cycle is included. As shown in graphical user interface 600, 11 total cycles are shown, which are used as the dialysis prescription. For each cycle, the user 202 inputs additional information regarding operations to be taken during a dialysis treatment for a patient. For instance, for each cycle, the user 202 may input information such as a cycle number ("CycleNo"), a cycle sub-number ("CycleSubNo"), a cycle type ("Cycle type"), a group ("Group"), a phase type ("Phase type"), a phase volume ("Phase volue"), a solution identifier ("Solution Id"), a flowrate ("Flowrate"), an X value ("X"), and a Y value ("Y"). For instance, the cycle number indicates the number of cycles for the treatment. The cycle type indicates the type of cycle used for the treatment. The group indicates the complete cycle that includes Fill, Drain, and Dwell. The phase type indicates if the type of cycle is Fill, Drain, or Dwell. The phase volume indicates a total volume of the cycle. The solution identifier indicates the type of solution used for the respective cycle. The flowrate indicates the flowrate of the volume during the associated phase. The X value and the Y value are parameters that are utilized to generate the profile graphs. The dialysis prescription information shown in FIGS. 6A and 6B is merely exemplary and the dialysis prescription information may include additional and/or alternative information.

At block 406, the simulator computing device 204 obtains dialysis treatment information for the dialysis treatment. For instance, referring back to FIG. 5, the user 202 may select the "Treatment" tab, which shows one or more additional graphical user interfaces. FIGS. 7A-7D show exemplary user interfaces for inputting information that is used to generate the dialysis treatment file according to one or more examples of the present application. In particular, FIGS. 7A-7D show four graphical user interfaces 700-730 that are displayed by the simulator computing device 204, and the user 202 uses the graphical user interfaces 700-730 to input dialysis treatment information for the dialysis treatment. The dialysis treatment information may include any information associated with the dialysis treatment for the patient. In other words, rather than actually performing the dialysis treatment for the patient, the user 202 may use graphical user interfaces 700-730 to simulate the dialysis treatment for the patient and provide the simulated information such that the simulator computing device 204 obtains the dialysis treatment information associated with the simulation.

For example, the simulator computing device 204 may obtain treatment information from the user 202 based on graphical user interface 700. The treatment information shows the stages (e.g., phases or sub-phases) of the simulated dialysis treatment for the patient. The simulator computing device 204 may obtain summary phase information from the user 202 based on graphical user interface 710. The summary phase information shows a summary of the simulated dialysis treatment at each stage of the dialysis treatment. The simulator computing device 204 may obtain mitigation and interaction information from the user 202 based on graphical user interface 720. The mitigations indicate alarms that occurred during the dialysis treatment. The interactions indicate simulated operator (e.g., user) interactions with the patient during the dialysis treatment. The simulator computing device 204 may obtain statistic information from the user 202 based on graphical user interface 730. The statistic information may indicate statistics associated with the dialysis treatment. The dialysis treatment information shown in FIGS. 7A-7D are merely exemplary and the dialysis treatment information may include additional and/or alternative information.

At block 408, the simulator computing device 204 generates a dialysis treatment file for the dialysis treatment associated with the patient based on the general patient information, the dialysis prescription information, and the dialysis treatment information. For instance, at blocks 402-406, the simulator computing device 204 obtains the general patient information, the dialysis prescription information, and the dialysis treatment information. After, the simulator computing device 204 converts the obtained information into a dialysis treatment file that is in a data format that is suitable for and/or compatible with the enterprise software application (e.g., an enterprise system) operated and/or managed by the dialysis treatment file computing device 212.

For example, a medical system 210 may generate a dialysis treatment file after completing a dialysis treatment for a patient. The dialysis treatment file is in a particular data format that is able to be processed by the dialysis treatment file computing device 212. Furthermore, instead of completing a dialysis treatment, the simulator computing device 204 may generate a simulated dialysis treatment file that is in the particular data format that is able to be processed by the dialysis treatment file computing device 212. For instance, the simulator computing device 204 may incorporate the general patient information, the dialysis prescription information, and the dialysis treatment information into the dialysis treatment file by converting the obtained information into a data format that is suitable for the enterprise software application. FIGS. 8A-C show the incorporation of the general patient information, the dialysis prescription information, and the dialysis treatment information into the dialysis treatment file.

FIGS. 8A-8C show exemplary user interfaces for displaying a simulated dialysis treatment file according to one or more examples of the present application. For instance, the graphical user interfaces 800-820 show portions of a dialysis treatment file that is generated based on the general patient information, the dialysis prescription information, and the dialysis treatment information. The portions of the dialysis treatment file shown in user interfaces 800-820 are merely exemplary and the dialysis treatment file may include additional and/or alternative information such as additional/alternative information associated with the general patient information, the dialysis prescription information, and/or the dialysis treatment information.

At block 410, the simulator computing device 204 stores the dialysis treatment file into an external device such as the external device 208 (e.g., the patient card reader) shown in FIG. 2. For instance, after generating the dialysis treatment file, the simulator computing device 204 may provide the dialysis treatment file to the external device, and the external device may store the dialysis treatment file. Additionally, and/or alternatively, the simulator computing device 204 may store the dialysis treatment file in the dialysis treatment file computing device 212 and/or within itself (e.g., in the memory of the simulator computing device 204).

At block 412, after retrieving the dialysis treatment file, a computing device (e.g., the simulator computing device 204 and/or the dialysis treatment file computing device 212) inputs the dialysis treatment file into a dialysis treatment application (e.g., an enterprise software application) to convert the dialysis treatment file into a user interface indicating the simulated results of the dialysis treatment. For example, the computing device may retrieve the dialysis treatment file from the external device 208 and/or another storage location (e.g., from within the memory of the simulator computing device 204). Afterwards, the computing device may upload (e.g., input) the dialysis treatment file into the enterprise software application. Based on uploading the dialysis treatment file, the computing device may generate one or more user interfaces that outputs information associated with the dialysis treatment file.

For example, in some instances, the enterprise software application may be a therapy management application or system that allows clinicians to create programs and/or review treatments for dialysis machines (e.g., home dialysis machines). For instance, rather than having to perform a plurality of actual dialysis treatments on a plurality of patients, which may be time consuming, the simulator computing device 204 may simulate the dialysis treatments by creating a simulated dialysis treatment file. The simulated dialysis treatment file may include information similar to the information obtained after performing an actual dialysis treatment. For instance, the simulated dialysis treatment file may include information such as dialysis treatment information shown in FIGS. 7A-7D, which may include statistics, mitigations, interactions, and/or other information associated with a simulated dialysis treatment.

At block 414, the computing device (e.g., the simulator computing device 204 and/or the dialysis treatment file computing device 212) causes display of the user interface indicating simulated results of the dialysis treatment. For example, the computing device may include and/or connected to a display device that displays the user interface indicating the simulated results.

In some examples, the simulator computing device 204 generates dialysis treatment files to test and verify that the enterprise software application is operating properly. For instance, after the dialysis treatment file computing device 212 displays the user interface indicating the simulated results, the displayed user interface may be compared with the user 202 provided information from blocks 402-406 (e.g., the general patient information, the dialysis prescription information, and the dialysis treatment information). For example, the user 202 may manually compare the user obtained information with the displayed user interface to determine whether the functionality of the enterprise software application is working properly (e.g., whether the user interface displays certain attributes provided within the general patient information, the dialysis prescription information, and the dialysis treatment information properly and/or accurately). Additionally, and/or alternatively, the dialysis treatment file computing device 212 and/or the simulator computing device 204 may be used to determine whether the functionality of the enterprise software application is working properly. To put it another way, the general patient information, the dialysis prescription information, and the dialysis treatment information may include attributes that are input by the user 202 such as mitigations or alarms. To ensure the mitigations, alarms, and/or other information is displayed properly within the enterprise software application, the user 202 may provide information to the simulator computing device 204 indicating these attributes. Subsequently, the simulator computing device 204 may generate a dialysis treatment file indicting these attributes, and the dialysis treatment file computing device 212 may generate/display a user interface indicating these attributes (e.g., the mitigations/alarms). As such, the user interface indicating the attributes may be compared with the original user 202 provided information to ensure the mitigations, alarms, and/or other information is displayed properly. FIGS. 9A-9D will describe this in more detail.

FIGS. 9A-9D show exemplary user interfaces for displaying the simulated dialysis treatment file in an enterprise software application according to one or more examples of the present application. For example, referring to FIG. 9A, two user interfaces 900 and 910 are shown. The user interface 900 is similar to the user interface 720 from FIG. 7C that is displayed by the simulator computing device 204. For instance, the user interface 900 includes mitigation information such as codes (e.g., alarms) that are simulated during the simulated dialysis treatment. Based on converting the dialysis treatment information into a dialysis treatment file and inputting the dialysis treatment file into a dialysis treatment application, the computing device (e.g., the simulator computing device 204 and/or the dialysis treatment file computing device 212) converts the dialysis treatment file into the user interface 910. For instance, arrows 902-906 denote how the dialysis treatment information within the dialysis treatment file is displayed on the user interface 910. For example, code "G100" and "G155" indicate dialysis machine alarms ("DM Alarm").

Figure 9A:
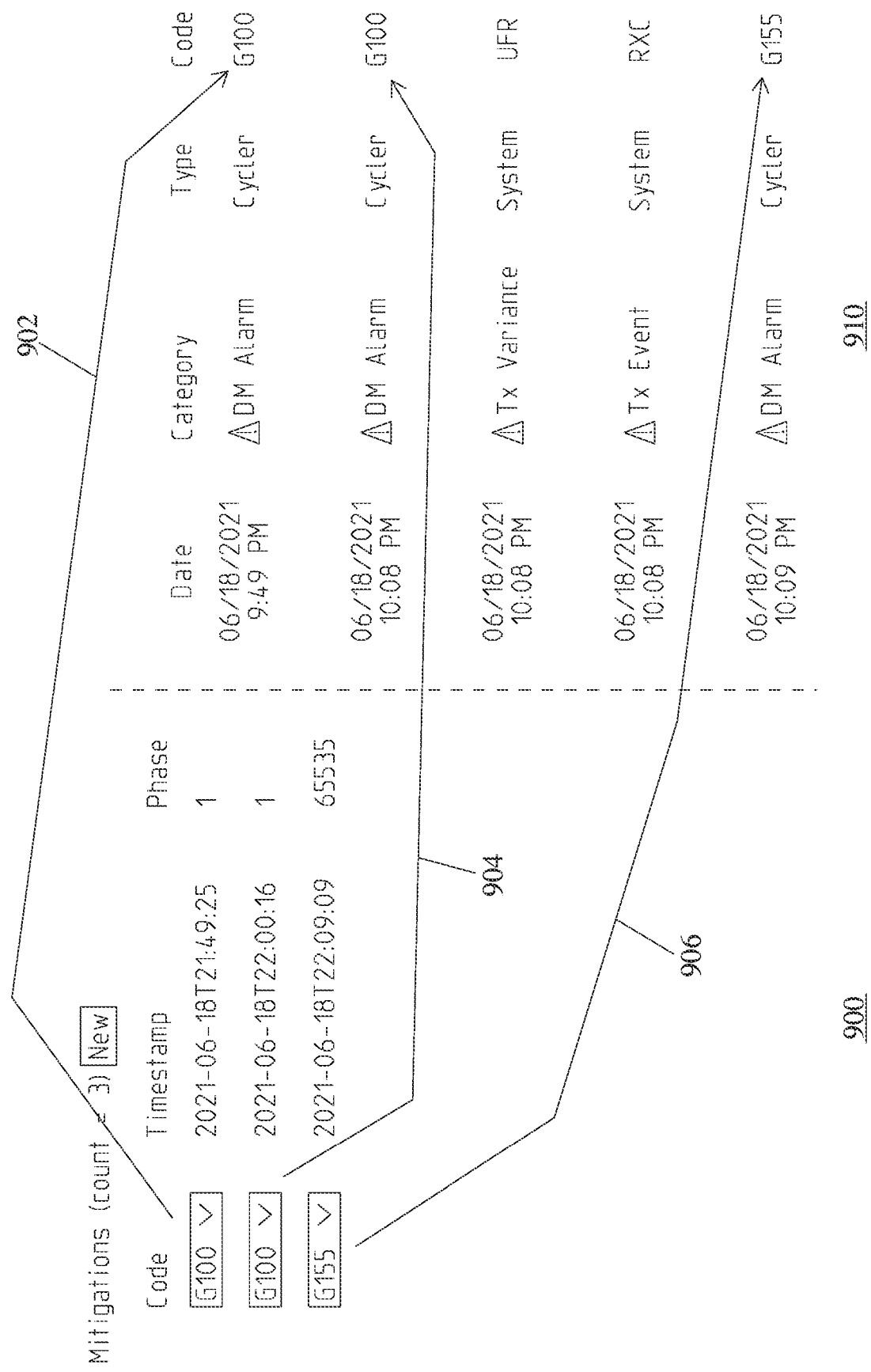
Figure 9B:
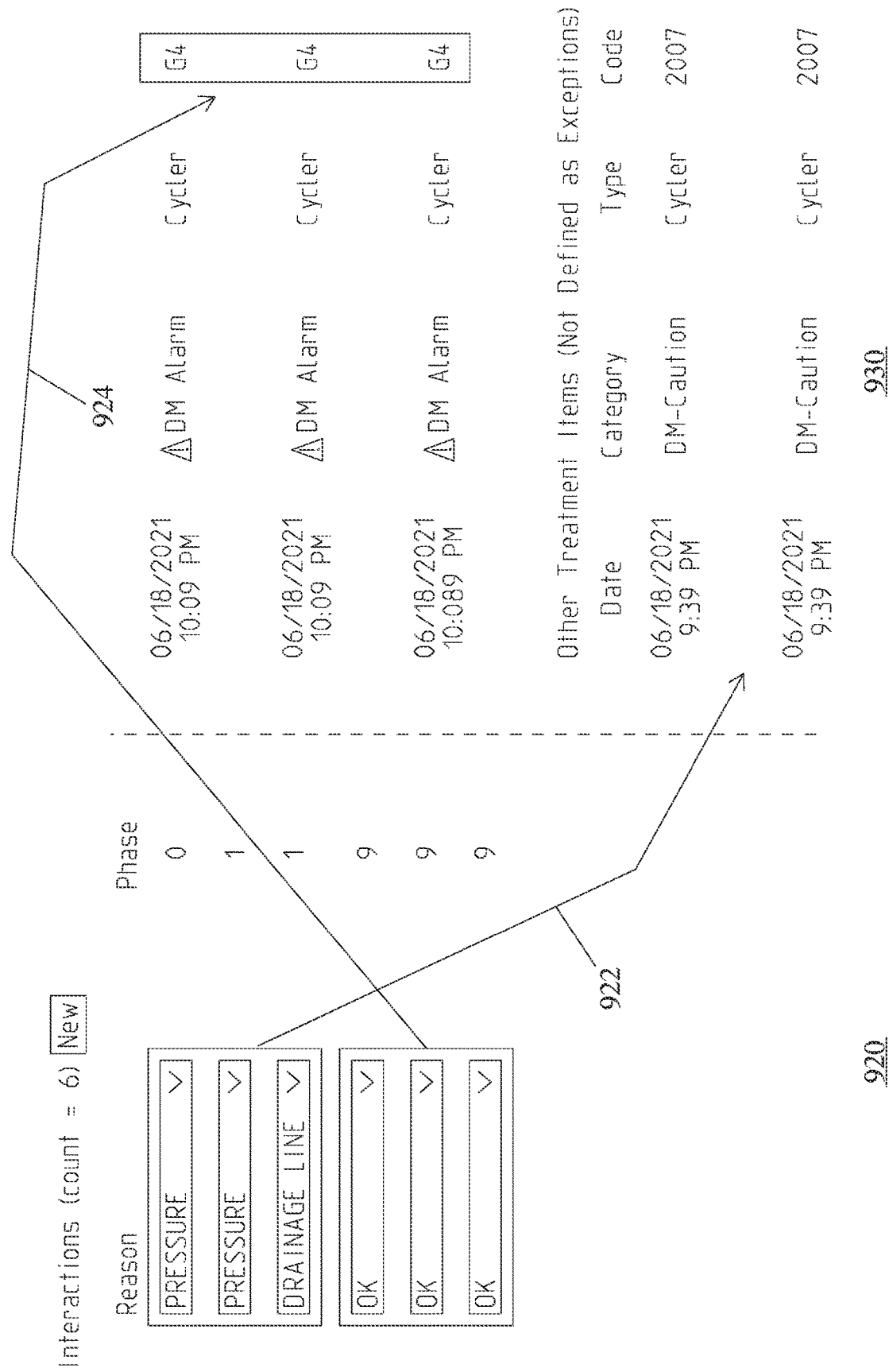

FIG. 9B shows user interfaces 920 and 930. The user interface 920 is similar to user interface 720 from FIG. 7C that is displayed by the simulator computing device 204. For instance, the user interface 920 includes interaction information. Based on converting the dialysis treatment information into a dialysis treatment file and inputting the dialysis treatment file into a dialysis treatment application, the computing device converts the dialysis treatment file into the user interface 930. For instance, arrows 922 and 924 denote how the dialysis treatment information within the dialysis treatment file is displayed on the user interface 930.

Figure 9C:
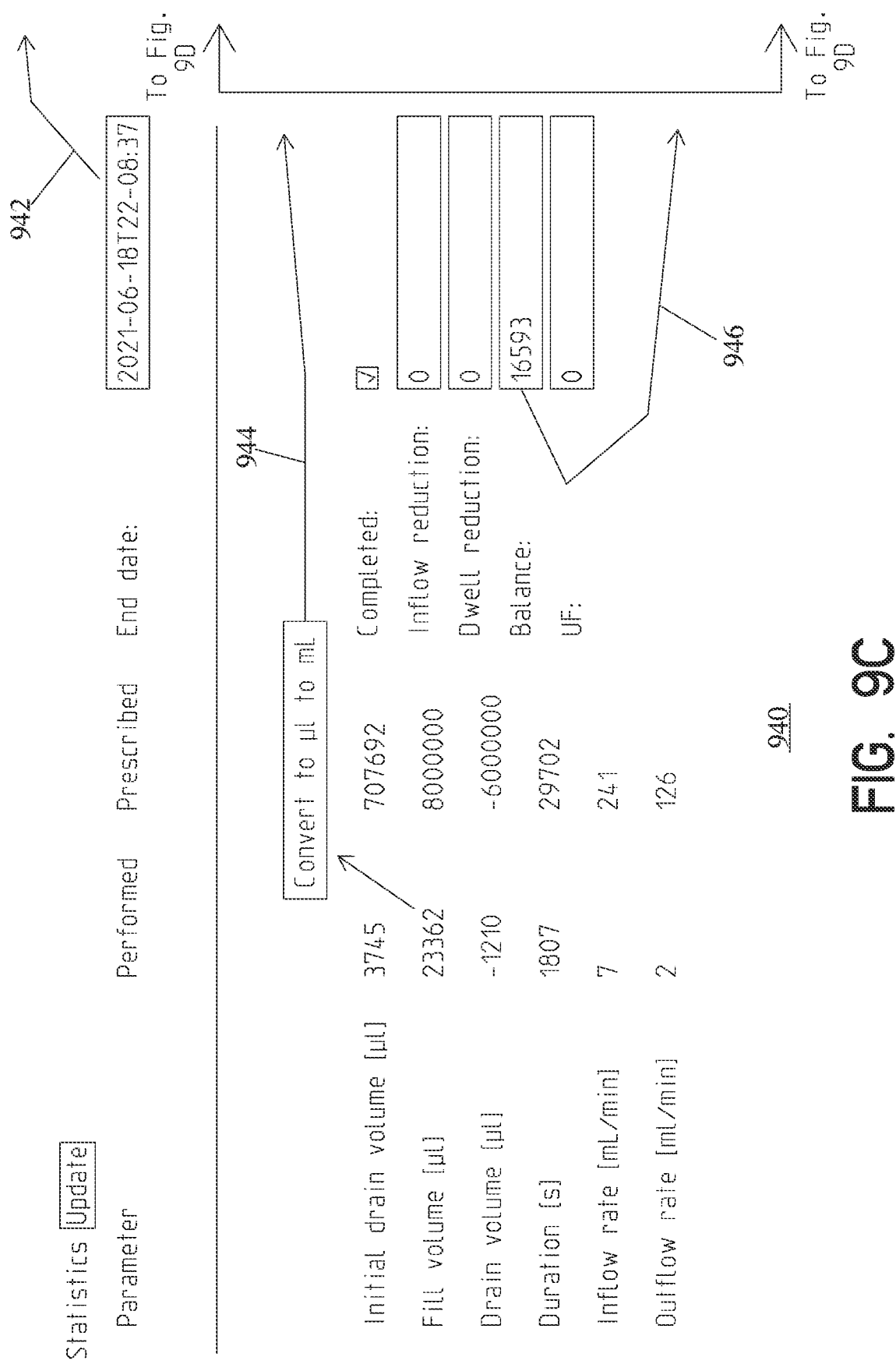

FIGS. 9C and 9D show user interfaces 940 and 950. The user interface 940 is similar to user interface 730 shown in FIG. 7D and shows statistics information. Based on converting the dialysis treatment information into a dialysis treatment file and inputting the dialysis treatment file into a dialysis treatment application, the computing device converts the dialysis treatment file into the user interface 950. For instance, arrows 942-946 denote how the dialysis treatment information within the dialysis treatment file is displayed on the user interface 950.

In some instances, referring back to blocks 402-406, rather than generating an original dialysis treatment file, the simulator computing device 204 may update, edit, revise, and/or otherwise alter an existing dialysis treatment file, and generate a new simulated dialysis treatment file based on the existing dialysis treatment file and information provided by the user 202. For instance, the medical system 210 may perform a dialysis treatment for a patient and provide a dialysis treatment file associated with the dialysis treatment to the simulator computing device 204. The simulator computing device 204 may process the existing dialysis treatment file from the medical system 210, and display the information from the existing dialysis treatment file. The user 202 may provide user input that provides additional information and/or changes the information from the existing dialysis treatment file (e.g., the user 202 may update the mitigation section to include additional alarms and/or change the dialysis prescription). Subsequently, at block 408, the simulator computing device 204 generates a new dialysis treatment file based on the existing dialysis treatment file from the medical system 210 and the user input indicating the additional information/changes to the existing dialysis treatment file. The process 400 may continue after generating the new dialysis treatment file as described above.

In some examples, the fields used to provide the general patient information, the dialysis prescription information, and/or the dialysis treatment information may have a pre-filled default value that the user 202 may replace. In some variations, the user 202 may provide a null value for one or more attributes of the general patient information, the dialysis prescription information, and the dialysis treatment information. In some instances, the simulator computing device 204 may output a dialysis treatment file using a particular naming convention. In some examples, the simulator computing device 204 may generate and populate count values when necessary. In some variations, the simulator computing device 204 may renaming the generated dialysis treatment file or choose a name for the generated dialysis treatment file to ensure that the generated dialysis treatment file does not replace an existing file. In some instances, the simulator computing device 204 may use a web browser to generate the dialysis treatment file. In some examples, the simulator computing device 204 may provide a functionality to allow the user 202 to clear all values and reset to a default state.

In some instances, the simulator computing device 204 may provide the functionality for a user 202 to create values for a basic dialysis prescription to populate the prescription section of the dialysis treatment file. In some examples, the simulator computing device 204 may provide the functionality for a user 202 to enter a patient ID, a prescription ID, and a device ID. In some variations, the simulator computing device 204 may provide the functionality for a user 202 to enter values for a dialysis treatment that is expected to be based on contents of the values in the prescription section (e.g., fields for cycle, fields for phases, and fields for alarms). In some instances, the simulator computing device 204 may provide the functionality for the user 202 to select a treatment start date using a calendar type of control, to see a grid with default phases, to edit existing phase items, to generate some or all of the statistics for the dialysis treatment, to add spot flowrate values, to create new interactions with the required fields populated with default values.

It will be appreciated that the various machine-implemented operations described herein may occur via the execution, by one or more respective processors, of processor-executable instructions stored on a tangible, non-transitory computer-readable medium, such as a random access memory (RAM), read-only memory (ROM), programmable read-only memory (PROM), and/or another electronic memory mechanism. Thus, for example, operations performed by any device described herein may be carried out according to instructions stored on and/or applications installed on the device, and via software and/or hardware of the device.

All references, including publications, patent applications, and patents, cited herein are hereby incorporated by reference to the same extent as if each reference were individually and specifically indicated to be incorporated by reference and were set forth in its entirety herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present application covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A system, comprising:
    a dialysis treatment machine comprising a compartment storing dialysate and a patient line coupled to an actual patient, wherein the dialysis treatment machine is configured to perform a dialysis treatment for the actual patient;
    an external device; and
    a simulation server configured to:
        receive an existing dialysis treatment file associated with performing the dialysis treatment for the actual patient, wherein the existing dialysis treatment file comprises existing dialysis treatment information;
        obtain patient information for a simulated dialysis treatment of a simulated patient;
        obtain dialysis prescription information for the simulated dialysis treatment;
        modify the existing dialysis treatment information for the simulated dialysis treatment to generate modified dialysis treatment information;
        generate a dialysis treatment file for the simulated dialysis treatment of the simulated patient based on the patient information, the dialysis prescription information, and the modified dialysis treatment information, wherein the dialysis treatment file is in a data format compatible with a dialysis treatment application for reviewing dialysis treatments performed by home dialysis machines; and
        send the dialysis treatment file to the external device;
    wherein the external device is configured to:
        store the dialysis treatment file from the simulation server; and
    wherein the system further comprises a dialysis treatment file computing device configured to:
        receive, from a user, user input comprising a list of user alarms;
        retrieve the dialysis treatment file from the external device;
        input the dialysis treatment file into the dialysis treatment application to convert the dialysis treatment file into a user interface indicating simulated results of the simulated dialysis treatment, wherein the simulated results indicate simulated alarms that were triggered during the simulated dialysis treatment;
        compare the simulated alarms that were triggered during the simulated dialysis treatment with the list of user alarms from the user input to determine whether the simulated alarms match the list of user alarms; and
        determine the dialysis treatment application is functioning properly based on the simulated alarms matching the list of user alarms, wherein the dialysis treatment application is used for reviewing the dialysis treatments performed by the home dialysis machines based on determining the dialysis treatment application is functioning properly.

2. The system of claim 1, wherein the modified dialysis treatment information indicates stages of the simulated dialysis treatment for the simulated patient and the simulated alarms that were triggered during the simulated dialysis treatment.

3. The system of claim 2, wherein the modified dialysis treatment information further indicates simulated user interactions during the simulated dialysis treatment and statistics associated with the simulated dialysis treatment.

4. The system of claim 3, wherein the dialysis prescription information indicates a dialysis prescription for the simulated patient.

5. The system of claim 4, wherein the patient information indicates a type of dialysis device used for the simulated dialysis treatment.

6. The system of claim 1, wherein the dialysis treatment machine is a peritoneal dialysis machine, wherein the external device is a patient card reader, wherein the patient card reader is configured to accept input of a patient card, and wherein the patient card reader is configured to store the dialysis treatment file from the simulation server by storing the dialysis treatment file on the patient card.

7. A method, comprising:
obtaining, by a system, patient information for a simulated dialysis treatment of a simulated patient;
receiving, by the system and from a user, user input comprising a list of user alarms;
obtaining, by the system, dialysis prescription information for the simulated dialysis treatment;
obtaining, by the system, dialysis treatment information for the simulated dialysis treatment;
generating, by the system, a dialysis treatment file for the simulated dialysis treatment of the simulated patient based on the patient information, the dialysis prescription information, and the dialysis treatment information, wherein the dialysis treatment file is in a data format compatible with a dialysis treatment application for reviewing dialysis treatments performed by home dialysis machines;
inputting, by the system, the dialysis treatment file into the dialysis treatment application to convert the dialysis treatment file into a user interface indicating simulated results of the simulated dialysis treatment, wherein the simulated results indicate simulated alarms that were triggered during the simulated dialysis treatment;
comparing, by the system, the simulated alarms that were triggered during the simulated dialysis treatment with the list of user alarms from the user input to determine whether the simulated alarms match the list of user alarms; and
determining, by the system, the dialysis treatment application is functioning properly based on the simulated alarms matching the list of user alarms, wherein the dialysis treatment application is used for reviewing the dialysis treatments performed by the home dialysis machines based on determining the dialysis treatment application is functioning properly.

8. The method of claim 7, wherein the dialysis treatment information indicates stages of the simulated dialysis treatment for the simulated patient and the simulated alarms that were triggered during the simulated dialysis treatment.

9. The method of claim 8, wherein the dialysis treatment information further indicates simulated user interactions during the simulated dialysis treatment and statistics associated with the simulated dialysis treatment.

10. The method of claim 9, wherein the dialysis prescription information indicates a dialysis prescription for the simulated patient.

11. The method of claim 10, wherein the patient information indicates a type of dialysis device used for the simulated dialysis treatment.

12. The method of claim 10, further comprising:
storing, by a first computing device of the system, the dialysis treatment file into an external device; and
retrieving, by a second computing device of the system, the dialysis treatment file from the external device.

13. The method of claim 12, wherein the external device is a patient card reader comprising a memory that stores the generated dialysis treatment file.

14. The method of claim 12, wherein generating the dialysis treatment file comprises generating, by the first computing device, the dialysis treatment file,
wherein inputting the dialysis treatment file into the dialysis treatment application comprises, inputting, by the second computing device, the dialysis treatment file into the dialysis treatment application, and
wherein the first computing device is separate from the second computing device.

15. The method of claim 14, further comprising:
receiving, from a medical system, an existing dialysis treatment file associated with performing a dialysis treatment on an actual patient,
wherein the existing dialysis treatment file comprises existing dialysis treatment information, and
wherein obtaining the dialysis treatment information comprises modifying the existing dialysis treatment information.

16. The method of claim 15, wherein the medical system is a peritoneal dialysis machine.

17. The method of claim 15, wherein the medical system is a hemodialysis machine.

18. One or more non-transitory computer-readable mediums having processor-executable instructions stored thereon, wherein the processor-executable instructions, when executed, facilitate:
obtaining patient information for a simulated dialysis treatment of a simulated patient;
receiving, from a user, user input comprising a list of user alarms;
obtaining dialysis prescription information for the simulated dialysis treatment;
obtaining dialysis treatment information for the simulated dialysis treatment;
generating a dialysis treatment file for the simulated dialysis treatment of the simulated patient based on the patient information, the dialysis prescription information, and the dialysis treatment information, wherein the dialysis treatment file is in a data format compatible with a dialysis treatment application for reviewing dialysis treatments performed by home dialysis machines;
storing the dialysis treatment file into an external device;
retrieving the dialysis treatment file from the external device;
inputting the dialysis treatment file into the dialysis treatment application to convert the dialysis treatment file into a user interface indicating simulated results of the simulated dialysis treatment, wherein the simulated results indicate simulated alarms that were triggered during the simulated dialysis treatment;
comparing the simulated alarms that were triggered during the simulated dialysis treatment with the list of user alarms from the user input to determine whether the simulated alarms match the list of user alarms; and
determining the dialysis treatment application is functioning properly based on the simulated alarms matching the list of user alarms, wherein the dialysis treatment application is used for reviewing the dialysis treatments performed by the home dialysis machines based on determining the dialysis treatment application is functioning properly.

19. The one or more non-transitory computer-readable mediums of claim 18, wherein the dialysis treatment information indicates stages of the simulated dialysis treatment for the simulated patient and the simulated alarms that were triggered during the simulated dialysis treatment.

20. The one or more non-transitory computer-readable mediums of claim 18, wherein the dialysis treatment information further indicates simulated user interactions during the simulated dialysis treatment and statistics associated with the simulated dialysis treatment.

* * * * *